United States Patent
Kinugasa et al.

(10) Patent No.: US 11,446,823 B2
(45) Date of Patent: Sep. 20, 2022

(54) METHOD FOR TRANSMITTING INFORMATION IN CONTROLLER AND METHOD FOR DETECTING ABNORMALITY IN ENCODER

(71) Applicant: Panasonic Intellectual Property Management Co., Ltd., Osaka (JP)

(72) Inventors: Yasuhiro Kinugasa, Osaka (JP); Kei Aimi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 362 days.

(21) Appl. No.: 16/780,867

(22) Filed: Feb. 3, 2020

(65) Prior Publication Data
US 2020/0171661 A1  Jun. 4, 2020

Related U.S. Application Data

(63) Continuation of application No. PCT/JP2018/027585, filed on Jul. 24, 2018.

(30) Foreign Application Priority Data

Aug. 8, 2017  (JP) .............................. JP2017-153530

(51) Int. Cl.
*B25J 9/16* (2006.01)
*G05B 19/19* (2006.01)
(Continued)

(52) U.S. Cl.
CPC ........... *B25J 9/1674* (2013.01); *B25J 9/1628* (2013.01); *B25J 15/0019* (2013.01); *G05B 19/19* (2013.01);
(Continued)

(58) Field of Classification Search
CPC .... B25J 13/088; B25J 9/1628; B25J 15/0019; B25J 9/1674; G01D 5/244; G01D 5/12;
(Continued)

(56) References Cited

U.S. PATENT DOCUMENTS 4,831,549 A * 5/1989 Red ..................... G05B 19/4182
700/254
2005/0264251 A1* 12/2005 Bischoff .............. G05B 19/406
318/563
(Continued)

FOREIGN PATENT DOCUMENTS

JP    2-085906    3/1990
JP    2004-330321    11/2004
(Continued)

OTHER PUBLICATIONS

International Search Report of PCT application No. PCT/JP2018/027585 dated Oct. 30, 2018.

*Primary Examiner* — Stephen Holwerda
(74) *Attorney, Agent, or Firm* — Wenderoth, Lind & Ponack L.L.P.

(57) ABSTRACT

A robot including a motor is used to machine a workpiece. The robot further includes the following components: a controller configured to output a speed command and commanded-position information; an encoder; a position sensor configured to output, as a differential signal, the amount of displacement of the position of the workpiece W from a predetermined position; a servo driver configured to control the motor upon receiving the speed command, the output signal of the encoder, and the differential signal; and a safety unit configured to detect a fault in the encoder. When controlling the motor based on the speed command, the output signal, and the differential signal, the servo driver sends the differential signal to the controller. The controller sends the safety unit new commanded-position information, (Continued)

which is generated by adding a correction value based on the differential signal to the commanded-position information.

10 Claims, 14 Drawing Sheets

(51) Int. Cl.
  *G05B 19/416* (2006.01)
  *B25J 15/00* (2006.01)
(52) U.S. Cl.
  CPC .. *G05B 19/416* (2013.01); *G05B 2219/37372* (2013.01); *G05B 2219/50391* (2013.01)
(58) Field of Classification Search
  CPC ................ G05B 19/416; G05B 19/19; G05B 2219/42329; G05B 2219/37372; G05B 2219/50391; G05B 19/4062; G05B 2219/42306; G05B 2219/37175
  See application file for complete search history.

(56) References Cited

U.S. PATENT DOCUMENTS

| | | | |
|---|---|---|---|
| 2007/0288124 A1 | 12/2007 | Nagata et al. | |
| 2010/0191374 A1* | 7/2010 | Tsai | G05B 19/404 901/46 |
| 2011/0202308 A1 | 8/2011 | Kishida et al. | |
| 2011/0221377 A1 | 9/2011 | Ueno | |
| 2014/0067124 A1* | 3/2014 | Williamson | B25J 9/1653 700/258 |
| 2014/0201571 A1* | 7/2014 | Hosek | G05B 19/41875 714/26 |
| 2014/0229005 A1* | 8/2014 | Suzuki | B25J 9/1692 700/254 |
| 2015/0142377 A1 | 5/2015 | Kishida et al. | |

FOREIGN PATENT DOCUMENTS

| | | |
|---|---|---|
| JP | 2010-284781 | 12/2010 |
| JP | 5367623 B | 12/2013 |
| JP | 5675761 B | 2/2015 |
| WO | 2006/022201 | 3/2006 |

* cited by examiner

METHOD FOR TRANSMITTING INFORMATION IN CONTROLLER AND METHOD FOR DETECTING ABNORMALITY IN ENCODER

This application is a continuation of the PCT International Application No. PCT/JP2018/027585 filed on Jul. 24, 2018, which claims the benefit of foreign priority of Japanese patent application No. 2017-153530 filed on Aug. 8, 2017, the contents all of which are incorporated herein by reference.

BACKGROUND ART

The present disclosure relates to a method for transmitting information from a controller and a method for detecting a fault in an encoder, the controller and the encoder being included in an operating device such as a robot.

BACKGROUND ART

There has been a technique of detecting a fault in an encoder used to detect the rotational position of a motor for driving the output shaft of an operating device such as a robot.

Patent Literature 1 discloses an encoder system that includes a first encoder for detecting the rotation of the input shaft of the motor, and a second encoder for detecting the rotation of the output shaft of the motor. Patent Literature 1 further discloses a technique of determining that either of the two encoders is faulty when the position measurement values detected by these encoders have a difference of not less than a given value.

Patent Literature 2 discloses s servo system including a safety unit for monitoring the proper control of the motor. According to the servo system, the safety unit receives a command value and a feedback value from the servo driver, which controls the motor. If there is a fault in these values, the safety unit generates a stop signal to be sent to the servo driver.

CITATION LIST

Patent Literature

PTL 1: Japanese Patent No. 5675761
PTL 2: Japanese Patent No. 5367623

SUMMARY

Technical Problem

However, many of the drive systems (motors) of general-purpose operating devices include a single encoder. Therefore, the technique of Patent Literature 1 cannot be applied to these general-purpose motors. Moreover, if the system according to Patent Literature 1 is newly produced, the system requires a plurality of sensors, which increases the cost.

Similarly, if the technique of Patent Literature 2 is applied to a general-purpose system not including a fault detection function, the servo driver requires the new function. As a result, it is necessary to develop both the servo driver and the safety unit. This increases man-hours.

FIG. 17 is a block diagram of the structure of the robot control unit according to the related art disclosed in Patent Literature 2. In the robot control unit shown in FIG. 17, controller 7 sends servo driver 10 a command signal. Servo driver 10 generates a current value for driving motor 4 based on the command signal from controller 7 and the detection signal from encoder 5, and then controls motor 4 based on the current value.

Servo driver 10 further generates a command value (motor command value), which is used for comparison and concerns the rotational position of motor 4 based on the command signal from controller 7, and then sends the generated command value to safety unit 9. Servo driver 10 further generates a value indicating the rotational position of motor 4 (motor detection value) based on the following information: the output signal of encoder 5; the reduction gear ratios of the shafts of motor 4; the point-of-origin information of motor 4 (hereinafter, simply "point-of origin information"); and other information. Servo driver 10 then sends the generated value to safety unit 9. Safety unit 9 compares the motor command value with the motor detection value both from servo driver 10, and determines the presence or absence of a fault in encoder 5 based on the comparison result.

Assume that the structure shown in FIG. 17 is applied to a general-purpose robot not including a fault detection unit for detecting a fault in encoder 5. The servo driver 10 of such a robot does not usually have the function of generating the motor command value and the motor detection value, or the function of outputting the generated motor command value and motor detection value.

This makes it necessary to provide the general-purpose robot with a newly designed circuit or program having the above-mentioned generation function and output function. The robot further needs a mechanism (e.g., a circuit, a program, a display) indicating whether the newly designed circuit or program is working properly. This takes time and complicates the process.

In the case of welding a workpiece using the above-mentioned robot, heat deformation during the welding may cause displacement of the position to be welded or displacement of the position of the workpiece itself. This results in unsuccessful welding even when the robot is operated as programed in the controller before the start of welding. Such problems are often avoided by using a sensor for detecting the displacement of the position of the workpiece and allowing the servo driver to control the motor on its own based on the information from the sensor.

However, when such control is carried out in the above conventional structure, the controller is not informed of the control information generated by the servo driver on its own to drive the motor. This can cause the safety unit to fail to properly detect a fault in the encoder. A similar problem can be caused when the controller sends the servo driver a speed command for fast response, and the servo driver controls the motor on its own based on the speed command.

To overcome the above problem, an object of the present disclosure is to provide a method for transmitting information from the controller and a method for detecting a fault in the encoder, both of which make the safety unit less likely to cause fault misdetection in the encoder when the servo driver controls the motor on its own.

Solution to Problem

To achieve the object, the method for transmitting information from the controller according to the present disclosure is carried out as follows. When controlling the motor based on other information than the main speed command from the controller and the output signal of the encoder, the servo driver sends the controller either the other information or control information about the motor generated by the servo driver. The controller generates new commanded-position information based on either the other information or the control information thus received and sends the new commanded-position information to the safety unit. This can prevent the safety unit from causing fault misdetection in the encoder. Meanwhile, in the method for detecting a fault in the encoder according to the present disclosure, the encoder is determined to be faulty when there is a difference of not less than a predetermined value between the detected-position information calculated based on the output signal of the encoder and the commanded-position information from the controller.

More specifically, the first method according to the present disclosure is a method for transmitting information from a controller included in an operating device, the operating device being configured to machine a workpiece and further including:
- a robot arm having an output shaft;
- a motor connected to the output shaft;
- an encoder configured to detect a rotational position of the motor;
- a position sensor configured to output, as a differential signal, the amount of displacement of the position of the workpiece from a predetermined position;
- a driver configured to receive
  - a speed command from the controller,
  - an output signal from the encoder, and
  - the differential signal from the position sensor,
- the driver being further configured to control driving of the motor at least based on the speed command and the output signal; and
- a fault detection unit configured to detect a fault in the encoder,
- the controller being configured to output
  - the speed command indicating the rotational position of the motor, and
  - commanded-position information showing the rotational position indicated by the speed command,
- the method including, when the driver controls the motor based on the speed command, the output signal, and the differential signal:
  - transmitting the differential signal from the driver to the controller; and
  - generating, by the controller, new commanded-position information, the new commanded-position information being a sum of the commanded-position information and a correction value, the correction value being converted from the differential signal so as to transmit the new commanded-position information from the controller to the fault detection unit.

According to the first method, the commanded-position information to be sent from the controller to the safety unit contains the correction value that is based on the amount of displacement of the position of the workpiece. This enables the control information of the motor generated by the servo driver on its own to be reflected on the commanded-position information, thereby facilitating the prevention of fault misdetection in the encoder by the fault detection unit.

The second method according to the present disclosure is a method for transmitting information from a controller included in an operating device, the operating device being configured to machine a workpiece and further including:
- a robot arm having an output shaft;
- a motor connected to the output shaft;
- an encoder configured to detect a rotational position of the motor;
- a position sensor configured to output, as a differential signal, the amount of displacement of the position of the workpiece from a predetermined position;
- a driver configured to receive
  - a speed command from the controller,
  - an output signal from the encoder, and
  - the differential signal from the position sensor,
- the driver being further configured to control driving of the motor at least based on the speed command and the output signal; and
- a fault detection unit configured to detect a fault in the encoder, the controller being configured to output
  - the speed command indicating the rotational position of the motor, and
  - commanded-position information showing the rotational position indicated by the speed command,
- the method including, when the driver controls the motor based on the speed command, the output signal, and the differential signal:
  - generating, by the driver, target position information based on the differential signal and the speed command so as to transmit the target position information from the driver to the controller; and
  - transmitting the target position information as new commanded-position information from the controller to the fault detection unit.

According to the second method, the target position information generated by the servo driver is defined as the commanded-position information. This enables the control information of the motor generated by the servo driver on its own to be reflected on the commanded-position information, thereby facilitating the prevention of fault misdetection in the encoder by the fault detection unit.

The third method according to the present disclosure is a method for transmitting information from a controller included in an operating device, the operating device further including:
- a robot arm having an output shaft;
- a motor connected to the output shaft;
- an encoder configured to detect a rotational position of the motor;
- a driver configured to receive
  - first and second speed commands from the controller, and
  - an output signal from the encoder,
- the driver being configured to control driving of the motor based on the output signal and at least one of the first and second speed commands; and
- a fault detection unit configured to detect a fault in the encoder,
- the controller being configured to output
  - the first and second speed commands indicating the rotational position of the motor and
  - commanded-position information showing the rotational position indicated by the first and second speed commands,
- the method including, when the driver controls the motor based on the first and second speed commands and the output signal of the encoder:
  - transmitting control information based on the second speed command from the driver to the controller; and
  - generating, by the controller, new commanded-position information, the new commanded-position information being a sum of the commanded-position information and a correction value, the correction value being converted from the control information based on the second speed command so as to transmit the new commanded-position information from the controller to the fault detection unit.

According to the third method, the commanded-position information to be sent from the controller to the safety unit contains the correction value into which the control information based on the second speed command has been converted. This enable the control information of the motor generated by the servo driver on its own to be reflected on the commanded-position information, thereby facilitating the prevention of fault misdetection in the encoder by the fault detection unit.

The fourth method according to the present disclosure is a method for transmitting information from a controller included in an operating device, the operating device further including:
  a robot arm having an output shaft;
  a motor connected to the output shaft;
  an encoder configured to detect the rotational position of the motor;
  a driver configured to receive
    first and second speed commands from the controller, and
    an output signal from the encoder,
  the driver being configured to control driving of the motor based on the output signal and at least one of the first and second speed commands; and
  a fault detection unit configured to detect a fault in the encoder, the controller being configured to output
    the first and second speed commands indicating the rotational position of the motor and
    commanded-position information showing the rotational position indicated by the first and second speed commands,
  the method including, when the driver controls the motor based on the first and second speed commands and the output signal of the encoder:
    generating, by the driver, target position information based on the first and second speed commands so as to transmit the target position information from the driver to the controller; and
    generating, by the controller, new commanded-position information based on the target position information so as to transmit the new commanded-position information from the controller to the fault detection unit.

According to the fourth method, the controller generates new commanded-position information based on the target position information generated by the servo driver and sends the new commanded-position information to the fault detection unit. This enables the control information of the motor generated by the servo driver on its own to be reflected on the commanded-position information, thereby facilitating the prevention of fault misdetection in the encoder by the fault detection unit.

The method according to the present disclosure is a method for detecting a fault in an encoder, the encoder being configured to detect the rotational position of a motor, the motor being configured to drive the output shaft of an operating device including the encoder and the motor, the operating device further including:
  a fault detection unit configured to detect the fault in the encoder;
  a controller configured
    to output a speed command indicating the rotational position of the motor, and
    to transmit commanded-position information to the fault detection unit by using the method for transmitting the information according to one of claims 1 to 4, the commanded-position information showing the rotational position indicated by the speed command; and
  a driver configured
    to receive the speed command from the controller and an output signal from the encoder and
    to control driving of the motor based on the speed command and the output signal,
  the method for detecting the fault in the encoder, including:
    receiving, by the fault detection unit, the commanded-position information from the controller and the output signal from the encoder, respectively;
    calculating, by the fault detection unit, detected-position information of the motor based on the output signal;
    comparing, by the fault detection unit, the commanded-position information with the detected-position information; and
    determining, by the fault detection unit, that the encoder is faulty when the difference between the commanded-position information and the detected-position information is not less than a predetermined value.

According to this method, the fault detection unit determines the presence or absence of a fault in the encoder based on the comparison result between the commanded-position information from the controller and the detected-position information calculated based on the output signal of the encoder. This achieves fault detection in the encoder without providing the driver with an additional structure or function for the fault detection in the encoder. In other words, fault detection in the encoder can be performed while minimizing the influence on, for example, the existing structure or circuit of a general operating device (e.g., robot or external shafts).

It is preferable that in the determining step, the fault detection unit should compensate the commanded-position information received from the controller for a time delay caused by a delay in drive control of the motor, and should determine the presence or absence of the fault in the encoder based on the comparison result between the detected-position information and the commanded-position information compensated for the time delay.

Thus, delaying the commanded-position information used for the fault determination of the encoder can eliminate the time lag due to the delay in the motor drive control, thereby improving the accuracy in the fault detection in the encoder.

It is preferable that in the determining step, the fault detection unit should determine the presence or absence of the fault in the encoder based on the comparison result between the detected-position information and a sum of the commanded-position information and an integrated value of the amount of change of the commanded-position information.

Thus, adding the integrated value to the commanded-position information used for the fault determination of the encoder increases the margin in the fault determination. This prevents the fault detection unit from erroneously determining that the encoder is faulty in spite that the encoder is operating properly.

It is preferable that in the determining step, the fault detection unit should determine the presence or absence of the fault in the encoder based on the comparison result between the detected-position information and a value obtained by adding a predetermined threshold to the sum of the integrated value and the commanded-position information.

According to this method, the threshold is added to the sum of the integrated value and the commanded-position information, and the resulting value is compared with the detected-position information. As a result, even if the operating device that is not operating performs an unintended operation while there is no change in the commanded-position information for a certain period of time, the fault detection unit can detect a fault in the encoder.

It is preferable that the operating device should further include a safety circuit configured to emergency-stop the operating device; that the controller should be configured to send the safety circuit an emergency stop signal in case of an emergency; and that in the determining step, when detecting the emergency stop signal sent from the controller, the fault detection unit should not determine that the encoder is faulty even if the difference between the commanded-position information and the detected-position information is not less than the predetermined value.

According to this method, even when there is a difference of not less than the predetermined value between the commanded-position information and the detected-position information after the controller outputs the emergency stop signal, the encoder is not determined to be faulty. For example, when the controller outputs an emergency stop signal and then stops outputting the speed command and the commanded-position information, the encoder that is operating properly can be easily prevented from being determined to be faulty.

Advantageous Effects of the Invention

As described above, according to the method for transmitting information from the controller in the present disclosure, when the servo driver controls the motor based on other information than the main speed command from the controller and the output signal of the encoder, the fault detection unit can be prevented from causing fault misdetection in the encoder. Furthermore, according to the method for detecting a fault in the encoder in the present disclosure, even in the case of using a general-purpose encoder, the presence or absence of a fault in the encoder can be detected with minimum influence on the existing functions and existing devices.

DESCRIPTION OF EMBODIMENTS

The exemplary embodiments will be described in detail as follows with reference to the drawings. Note that these embodiments are mere examples of the present invention, and do not intend to limit the invention, its application or use.

First Exemplary Embodiment

The Structure of the Robot and its Control System

Figure 1:
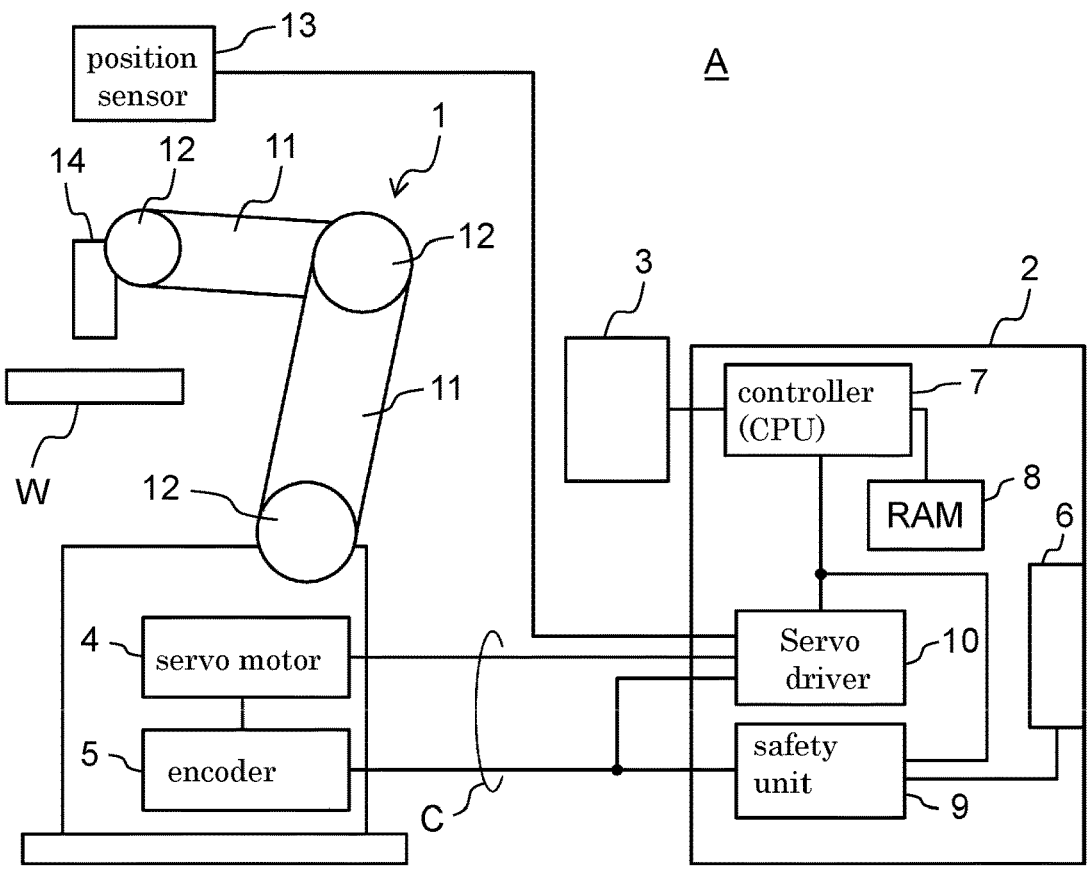
FIG. 1 is a schematic configuration view of the robot control system according to the first exemplary embodiment.
Figure 2:
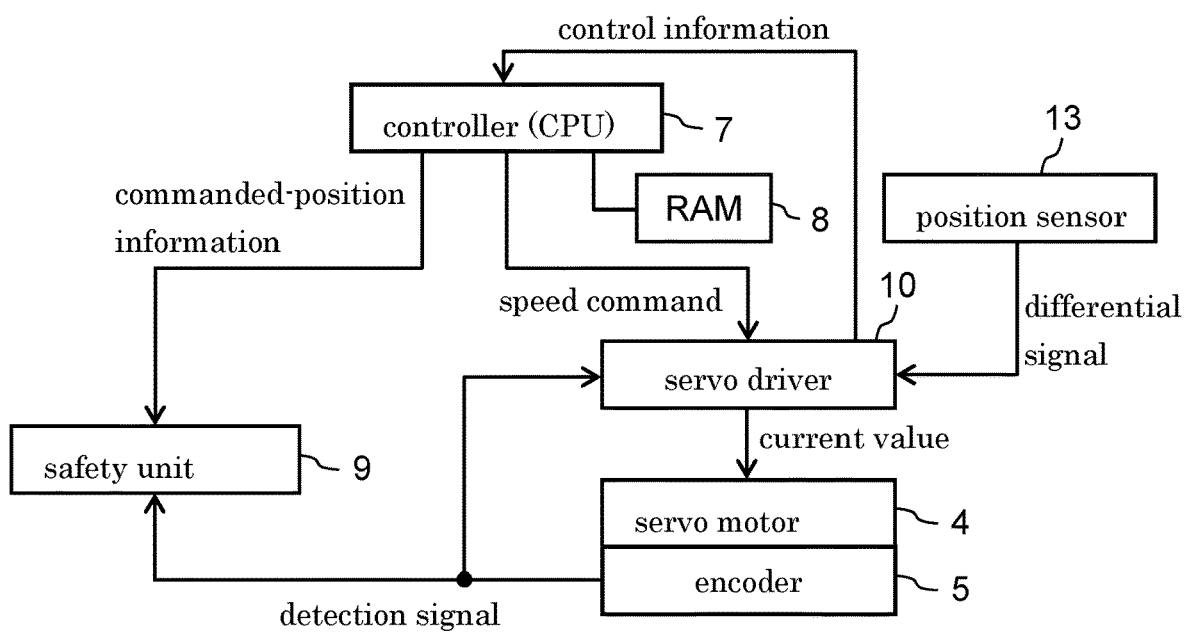
FIG. 2 is a block diagram of a structure of the robot control unit according to the first exemplary embodiment.

FIG. 1 is a schematic configuration view of a robot control system, which is the operating device of the present exemplary embodiment. FIG. 2 is a block diagram of a structure of robot control unit 2 in the robot control system illustrated with arrows indicating the direction of transmission of information and signals. The present exemplary embodiment includes robot "A", which is used to machine a workpiece W.

As shown in FIG. 1, the robot "A" includes robot mechanism unit 1, robot control unit 2, and operation unit 3 equipped with a display. Units 1 and 2 are connected to each other through a connection cable C. Although information is transmitted through the connection cable C in FIG. 1, it may alternatively be transmitted wirelessly. This holds true between the blocks.

Robot mechanism unit 1 includes a plurality of robot arms 11 and a plurality of joint shafts 12. Each robot arm 11 is driven by servo motor 4 (hereinafter, motor 4) equipped to it. When, for example, the robot "A" is a six-axis vertical articulated robot, the robot "A" includes six robot arms 11 and six motors 4 corresponding to arms 11. Each motor 4 is equipped with encoder 5 for detecting the rotational position of motor 4 or the amount of rotation of motor 4 based on the rotational position.

There is torch 14 for arc welding attached to the distal end of robot arms 11. Torch 14 is supplied with power from an unillustrated power supply unit so as to weld the workpiece W placed in a predetermined position on an unillustrated stage.

Robot mechanism unit 1 includes position sensor 13 for detecting the position of the workpiece W. Sensor 13 is provided separately from robot arms 11. Sensor 13 may be placed anywhere from which the welding trajectory from the start to the goal on the workpiece W can be checked.

Although not illustrated in FIG. 1, the robot "A" includes external shafts driven based on the drive control exerted by robot control unit 2 on robot mechanism unit 1. The external shafts are used in combination with robot mechanism unit 1 so as to expand the range of motion of the robot "A". Each external shaft is driven by motor 4 equipped with it. Each motor 4 is equipped with encoder 5 for detecting the rotational position of motor 4 or the amount of rotation based on the rotational position. Thus, each of joint shafts 12 and each of the external shafts is equipped with motor 4, which is equipped with encoder 5. The type of the external shafts is not particularly limited; for example, slider type, positioner type and other types are applicable to the present exemplary embodiment.

In the present exemplary embodiment, for easier understanding of the invention, motors 4 and encoders 5 used in joint shafts 12 and their equivalents used in the external shafts are not distinguished from each other in the drawings (e.g., FIG. 1) and the description. Therefore, motors 4 and encoders 5 referred to in the following description indicate both those used in joint shafts 12 and those used in the external shafts. In other words, the fault detection unit and the method for detecting a fault in encoders 5 described below are applicable to both encoders 5 attached to motors 4 in joint shafts 12 and encoders 5 attached to motors 4 in the external shafts.

Each encoder 5 is connected to safety unit 9 and servo driver 10, which will be described later, and sends (feeds back) the detected signal to safety unit 9 and servo driver 10.

Operation unit 3 includes an input unit (not shown) for receiving input from the operator of the robot "A" and a display (not shown). Unit 3 performs communications with robot control unit 2 based on the input from the user. This enables the operator to set or control the movement of robot arms 11 through operation unit 3. Note that the input unit may be a touch panel, and that the display may be integrated with the input unit.

Robot control unit 2 includes controller (e.g., CPU) 7, random access memory (RAM) 8 as a storage, safety unit 9 as a fault detection unit, servo driver 10, and safety circuit (controller) 6. Servo driver 10 drives each motor 4. Safety circuit (controller) 6 stops the driving power supply (not shown) of the robot "A" upon receiving an emergency stop signal from safety unit 9. In the present embodiment, the robot control system includes encoders 5, robot control unit 2, and position sensor 13.

RAM 8 stores information, such as the teaching program and the functional setting of the robot "A", which are generated by the operator using operation unit 3.

Controller 7 calculates the speed command (the rotation angle of motor 4 changing per unit time) based on the above-mentioned teaching program, the functional setting and other information stored in RAM 8. Controller 7 then sends the calculated speed command to servo driver 10 so as to perform the operation command of the robot "A". Furthermore, controller 7 integrates the speed command based on the point-of-origin position, and sends the integrated value as commanded-position information to safety unit 9. The speed command is calculated based, for example, on the reduction gear ratios and the point-of-origin position of the robot "A".

Position sensor 13, which is connected to servo driver 10, sends servo driver 10 the amount of displacement of the position of the workpiece W from a predetermined position. More specifically, sensor 13 sends driver 10 the amount of displacement of the position of the workpiece W with respect to the trajectory of robot arms 11 specified in the operational program as a differential signal in the XYZ coordinate system.

Servo driver 10 generates a current value for driving motors 4 based on the speed command from controller 7, the output signal of encoders 5, and if necessary, also on the differential signal from position sensor 13. Servo driver 10 then controls motors 4 based on the current value, thereby controlling the movement of the robot "A".

Safety unit 9 is directly connected to encoders 5 and controller 7. This unit 9 determines the presence or absence of a failure in encoders 5 based on the detected-position information of motors 4 calculated based on the output signal of encoders 5, and the commanded-position information from controller 7.

Figure 3:
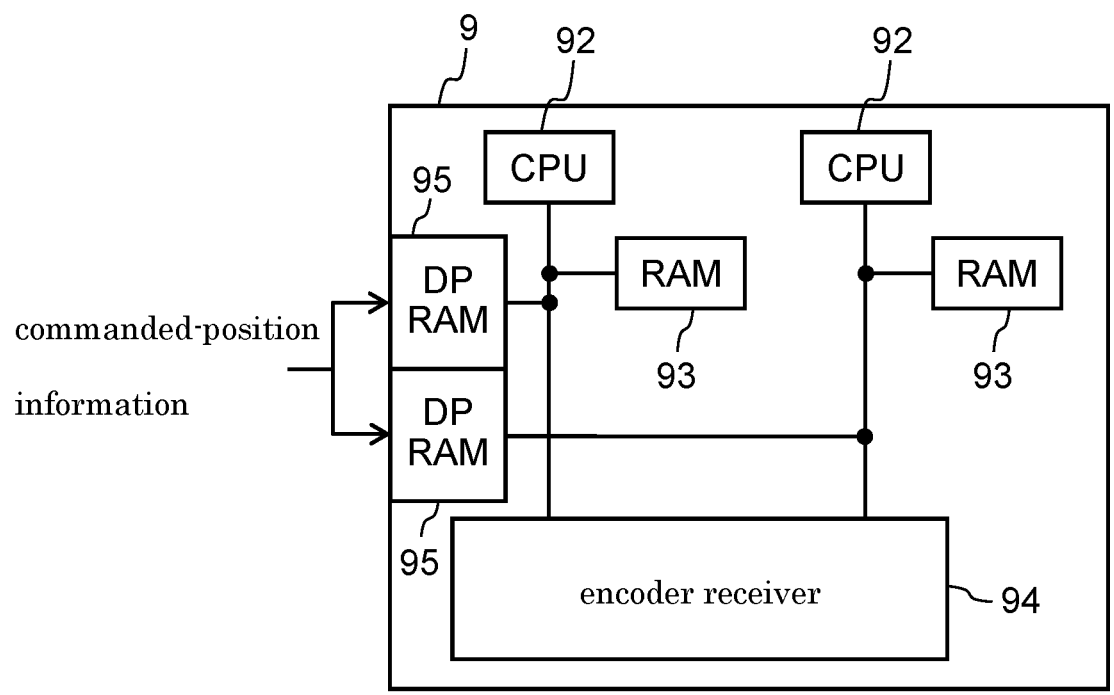
FIG. 3 is a block diagram of a structure of the safety unit.

FIG. 3 is a block diagram of a structure of safety unit 9.

As shown in FIG. 3, safety unit 9 includes CPUs 92 as determination units, RAMs 93, encoder receiver 94 as a first receiver, and dual-port RAMs (DPRAMs) 95 as second receivers.

Encoder receiver 94, which is connected to encoders 5, receives the output signal of encoders 5.

DPRAMs 95, which are connected to controller 7 of robot control unit 2, receive the commanded-position information from controller 7. This information is obtained by integrating the speed command sent from controller 7 to servo driver 10. The commanded-position information received by DPRAMs 95 is stored into RAMs 93.

CPUs 92 receive the output signal from encoder receiver 94 and calculate detected-position information concerning the present position of motors 4 by using the output signal, the reduction gear ratios and point-of-origin position of the robot "A". CPUs 92 then compare the commanded position based on the commanded-position information with the detected position based on the detected-position information so as to determine the presence or absence of a fault in encoders 5.

As shown in FIG. 3, safety unit 9 includes two identical sets of CPUs 92, RAMs 93 and DPRAMs 95. This enables parallel processing using two CPUs 92, so that the fault detection can be double checked to improve reliability.

The Procedure for the Controller to Output the Commanded-Position Information

The present exemplary embodiment will describe the case where, in order to adjust the displacement of the position of the workpiece W, servo driver 10 controls motors 4 based on the speed command from controller 7, the output signal of encoders 5, and the differential signal from position sensor 13.

Figure 4A:
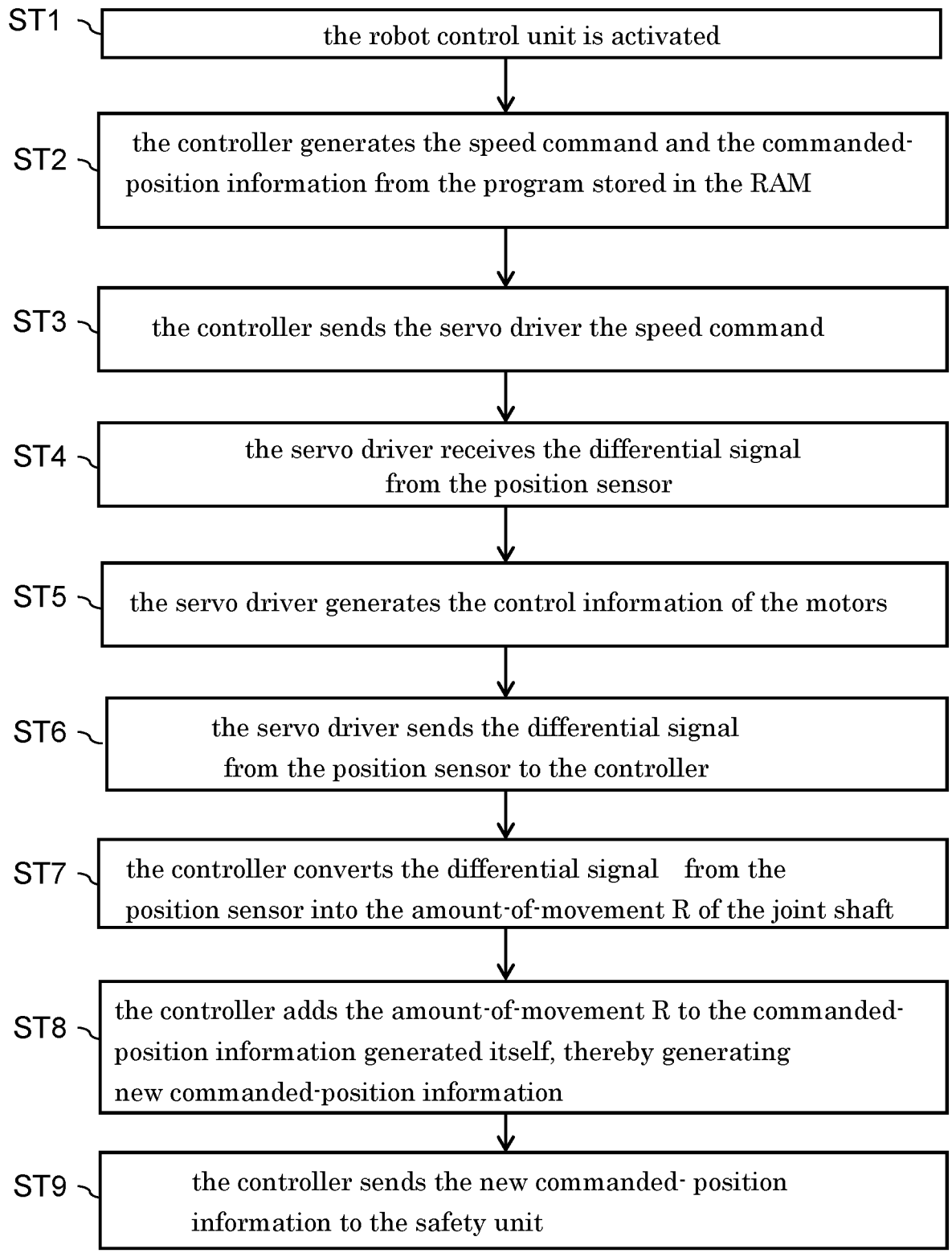
FIG. 4A is a flowchart showing a procedure for the controller to output the commanded-position information.
Figure 4B:
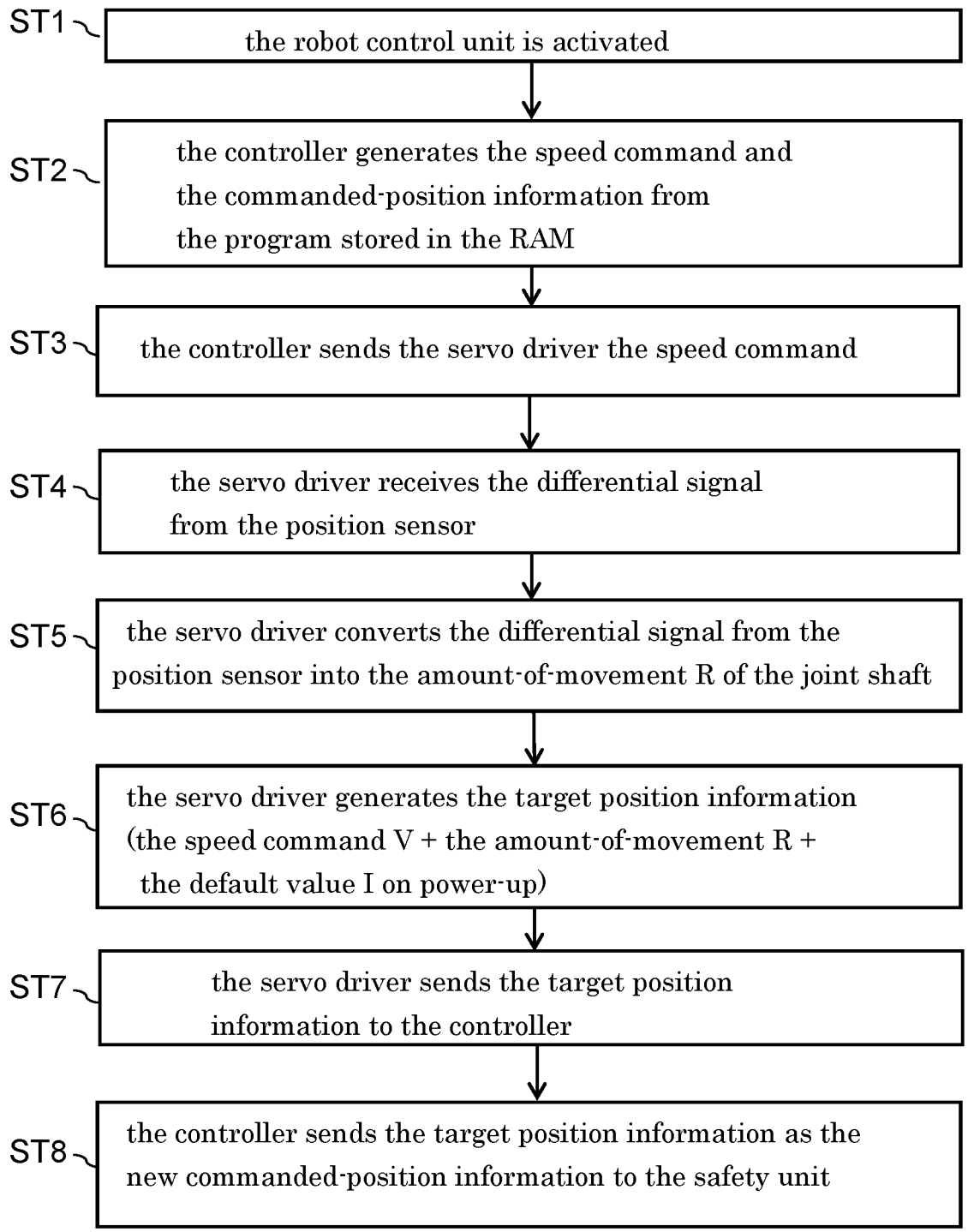
FIG. 4B is a flowchart showing another procedure for the controller to output the commanded-position information.

FIG. 4A is a flowchart showing a procedure for the controller to output the commanded-position information according to the present exemplary embodiment. FIG. 4B is a flowchart showing another procedure for the controller to output the commanded-position information.

In FIG. 4A, robot control unit 2 is powered and activated (Step ST1). In Step ST1, safety circuit 6, controller 7, RAM 8, safety unit 9 and servo driver 10 are activated. In addition, position sensor 13 is activated.

Next, controller 7 generates the speed command and the commanded-position information based on the information stored in RAM 8, such as the above-mentioned teaching program, the functional setting of the robot "A" and the point-of origin information (Step ST2). Controller 7 then sends the speed command to servo driver 10 (Step ST3).

Servo driver 10 receives the differential signal from position sensor 13 (Step ST4) and generates the control information for controlling the rotation of motors 4 based on the differential signal, the speed command from controller 7, and the output signal of encoders 5 (Step ST5). Servo driver 10 then sends the differential signal to controller 7 (Step ST6).

Controller 7 converts the received differential signal into the amount-of-movement R of the corresponding joint shaft, or in other words, into the rotation angle of the corresponding motor 4 in the clockwise or counterclockwise direction (Step ST7). Controller 7 then adds the amount-of-movement R as a correction value to the commanded-position information generated by itself, thereby generating new commanded-position information (Step ST8). Next, controller 7 sends the new commanded-position information to safety unit 9 (Step ST9).

On the other hand, Steps ST1 to ST4 in FIG. 4B are the same as their equivalents in FIG. 4A. Next, servo driver 10 converts the differential signal from position sensor 13 into the amount-of-movement R of the joint shafts (Step ST5) and generates the target position information as the control information (Step ST6). The "target position information" in this case is the sum of the amount-of-movement R, a speed command V from the controller, and the default value I on power-up. Servo driver 10 then sends the target position information to controller 7 (Step ST7). Controller 7 sends the received target position information as the new commanded-position information to safety unit 9 (Step ST8).

In FIGS. 4A and 4B, the step in which servo driver 10 receives the output signal from encoders 5 is not illustrated.

The steps in the flowcharts of FIGS. 4A and 4B do not necessarily have to be processed in the order shown in the flowcharts; the steps may be processed in different orders or by different methods. For example, Step ST4 may be before Step ST3 or may be parallel-processed with the process of Step ST3.

Method for Detecting a Fault in the Encoders

Figure 5:
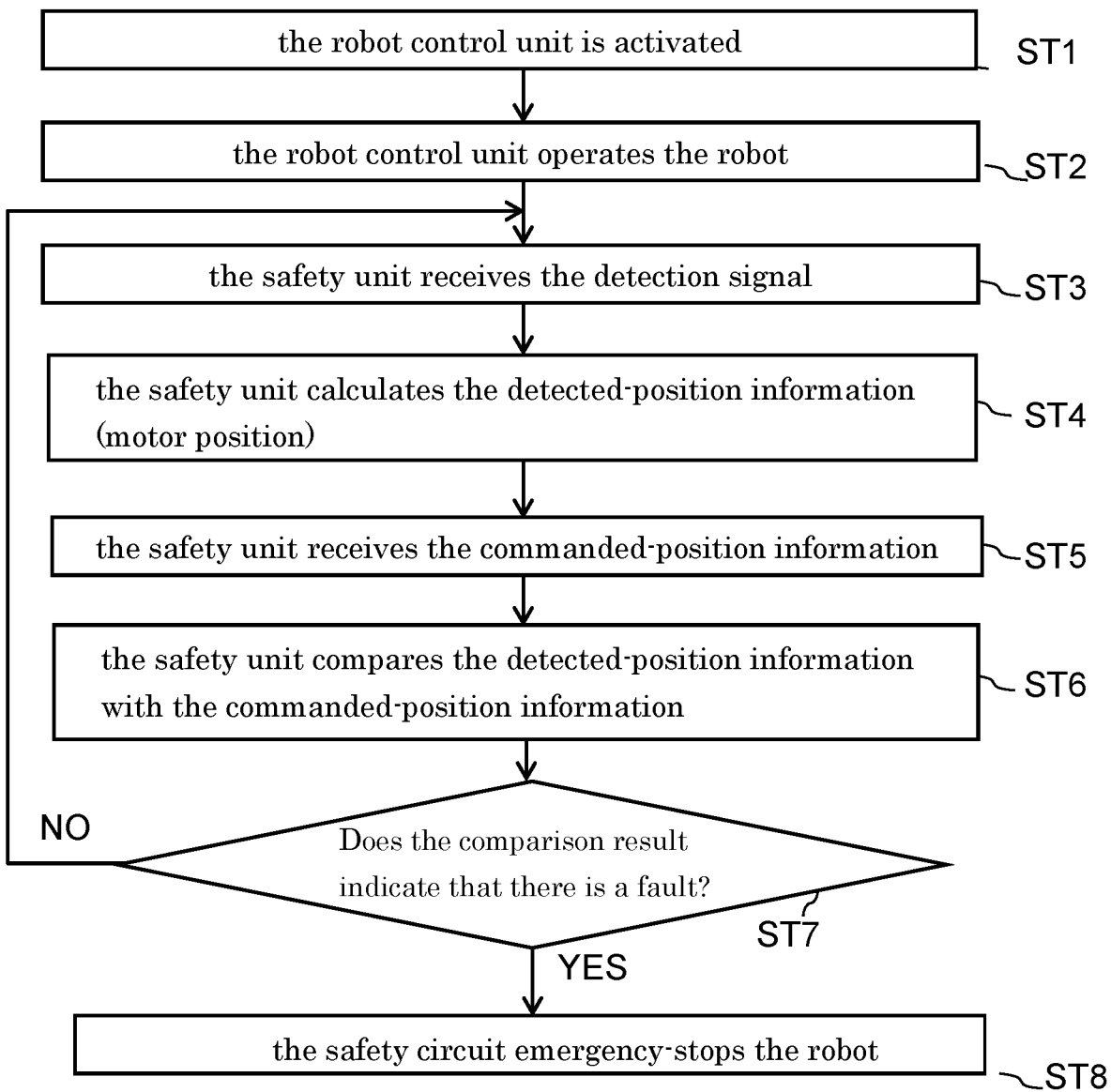
FIG. 5 is a flowchart showing a method for determining the presence or absence of a fault in an encoder.

FIG. 5 is a flowchart showing how safety unit 9 monitors the presence or absence of a fault in encoders 5 after robot control unit 2 activates the robot "A". More specifically, FIG. 5 shows how safety unit 9 monitors the presence or absence of a fault in encoders 5 when controller 7 makes servo driver 10 start to rotate motors 4.

In Step ST1, controller 7 of robot control unit 2 activates the robot "A", and the process proceeds to Step ST2.

In Step ST2, robot control unit 2 operates the robot "A" based on the teaching program, the functional setting, and other information that are set by the operator using operation unit 3. More specifically, controller 7 sends the speed command to servo driver 10 and the commanded-position information to safety unit 9, respectively, based on the information stored in RAM 8 such as the teaching program and the functional setting. Servo driver 10 drives motors 4 based on the speed command received from controller 7 so as to operate joint shafts 12 and the external shafts of the robot "A". Servo driver 10 receives the output signal from encoders 5 attached to motors 4 and performs feedback control of motors 4 based on the difference between the speed command and the output signal. At this moment, the output signal of encoders 5 is also sent to safety unit 9.

Upon receiving the output signal from encoders 5 (Step ST3), safety unit 9 calculates the position of the motors (Step ST4). More specifically, CPUs 92 of safety unit 9 convert the output signal of encoders 5 into the rotational position (present position) of motors 4 based on the reduction gear ratios of the shafts of motors 4, the point-of-origin information and other information of motors 4. The output signal of encoders 5 is transmitted, for example, as a pulse signal.

Furthermore, safety unit 9 receives the commanded-position information from controller 7 (Step ST5) and compares the detected-position information concerning the present position of motors 4 calculated in Step ST4 with the commanded-position information from controller 7 (Step ST6). More specifically, CPUs 92 of safety unit 9 compare the rotational position of motors 4 calculated based on the output signal of encoders 5 (motor detection value), with the rotational position of the motors received from controller 7 (motor command value). The commanded-position information in Steps ST5 and ST6 can be new commanded-position information shown in FIGS. 4A and 4B.

When the comparison result indicates that the difference between the motor command value and the motor detection value is not less than the predetermined value (YES in ST7), CPUs 92 determine that there is a fault in encoders 5, and the process proceeds to Step ST8. Meanwhile, when the difference between these values is less than the predetermined value (NO in Step ST7), CPUs 92 do not determine that there is a fault in encoders 5, and the process returns to Step ST3.

More specifically, in the drive control of the robot "A", motors 4 are moving to the position expected by controller 7. Therefore, the difference between the motor detection value indicating the rotational position of motors 4 (detected-position information) and the motor command value indicating the rotational position commanded by controller 7 (commanded-position information) should be within a predetermined threshold Pth. Hence, safety unit 9 determines that there is a fault in the encoders when the rotational position of the motors based on the motor detection value is determined to be away from the motor command position based on the motor command value by not less than the predetermined value.

In Step ST8, CPUs 92 of safety unit 9 send safety circuit 6 an emergency stop signal. Upon receiving this signal, safety circuit 6 stops the driving power supply of the robot "A" so as to emergency-stop the robot "A".

Thus, after controller 7 activates the robot "A", safety unit 9 repeats Steps ST3 to ST7 so as to determine whether there is a fault in encoders 5.

As described above, according to the present exemplary embodiment, safety unit 9 determines whether there is a fault in encoders 5 based on the comparison result between the position information directly received from controller 7 and the position information calculated based on the output signal of encoders 5. This enables the determination of the presence or absence of a fault in the encoders by adding safety unit 9 to the operating device such as a general-purpose robot not having a fault detection unit for the encoders. This can further reduce the influence on the existing system because there is no need to redesign the components of the existing general-purpose robot such as servo driver 10. Hence, the addition of safety unit 9 is applicable to operating devices and systems using general encoders. Furthermore, there is no need to inform the existing system that a process concerning fault determination of the encoders is being performed properly, thereby preventing complications of the processes.

This point will be described in comparison to the related art shown in FIG. 17.

Figure 17:
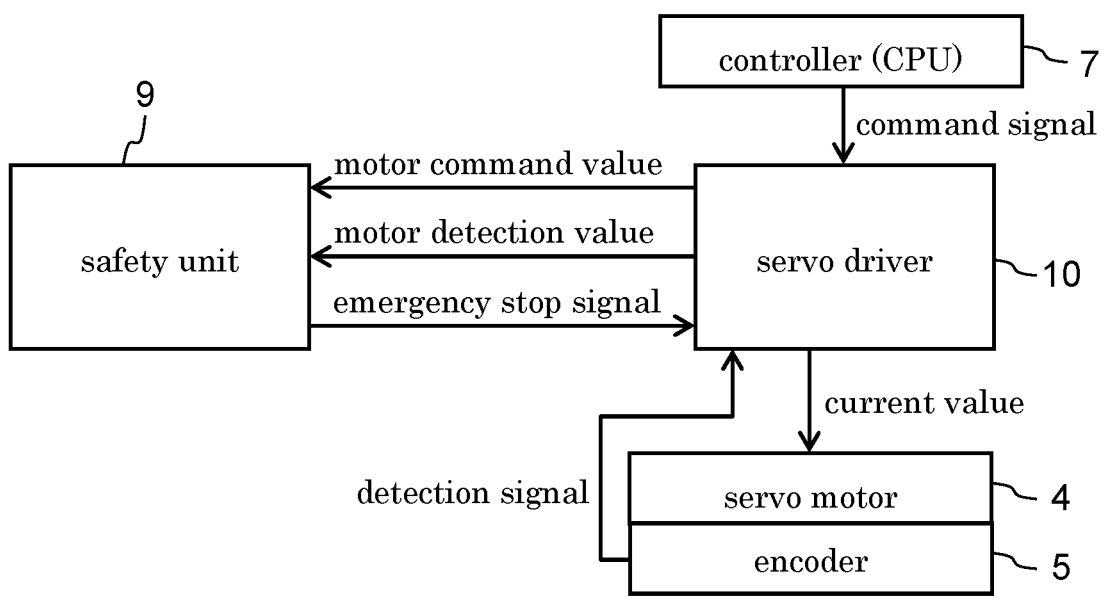
FIG. 17 is a block diagram of the structure of the robot control unit according to the related art.

Assume that the structure shown in FIG. 17 is applied to a general-purpose robot not having a fault detection unit for encoders 5. Servo driver 10 of the general-purpose robot usually does not have the function of generating the motor command value and the motor detection value or the function of outputting these generated values. Therefore, it is necessary to newly design a circuit or program having the above-mentioned functions. It is also necessary to provide a system (e.g., circuit, program, display) that shows whether the newly designed circuit or program is working properly. This takes time and complicates the process. On the other hand, the method for detecting a fault and the fault detection unit according to the present disclosure do not cause such problems.

As described above, controller 7 is not informed of the control information generated by servo driver 10 to drive motors 4. This may cause safety unit 9 to fail to properly detect a fault in encoders 5 based on the commanded-position information generated by controller 7.

According to the present exemplary embodiment, servo driver 10 may control the rotation of motors 4 based not only on the speed command from controller 7 and the output signal of encoders 5, but also on the differential signal from position sensor 13. In this situation, controller 7 may generate new commanded-position information based on the differential signal. Alternatively, servo driver 10 may generate target position information based on the differential signal, and controller 7 can define it as the new commanded-position information. Both cases enable the control information of motors 4 generated by servo driver 10 on its own to be reflected on the commanded-position information generated by controller 7. As a result, safety unit 9 can be prevented from causing fault misdetection in encoders 5, thereby maintaining high accuracy of fault detection.

When servo driver 10 generates the target position information (see Step ST6 in FIG. 4B), the control information generated by servo driver 10 can be reflected on the commanded-position information at a shorter cycle because the control cycle of servo driver 10 is shorter than that of controller 7.

In the present exemplary embodiment, when controlling the rotation of motors 4 without using the differential signal from position sensor 13, servo driver 10 does not send controller 7 the control information. Instead, controller 7 sends the commanded-position information generated by itself directly to safety unit 9. Thus, fault detection in encoders 5 is performed based on the procedure shown in FIG. 5.

Second Exemplary Embodiment

The Structure of the Robot and its Control System

Figure 6:
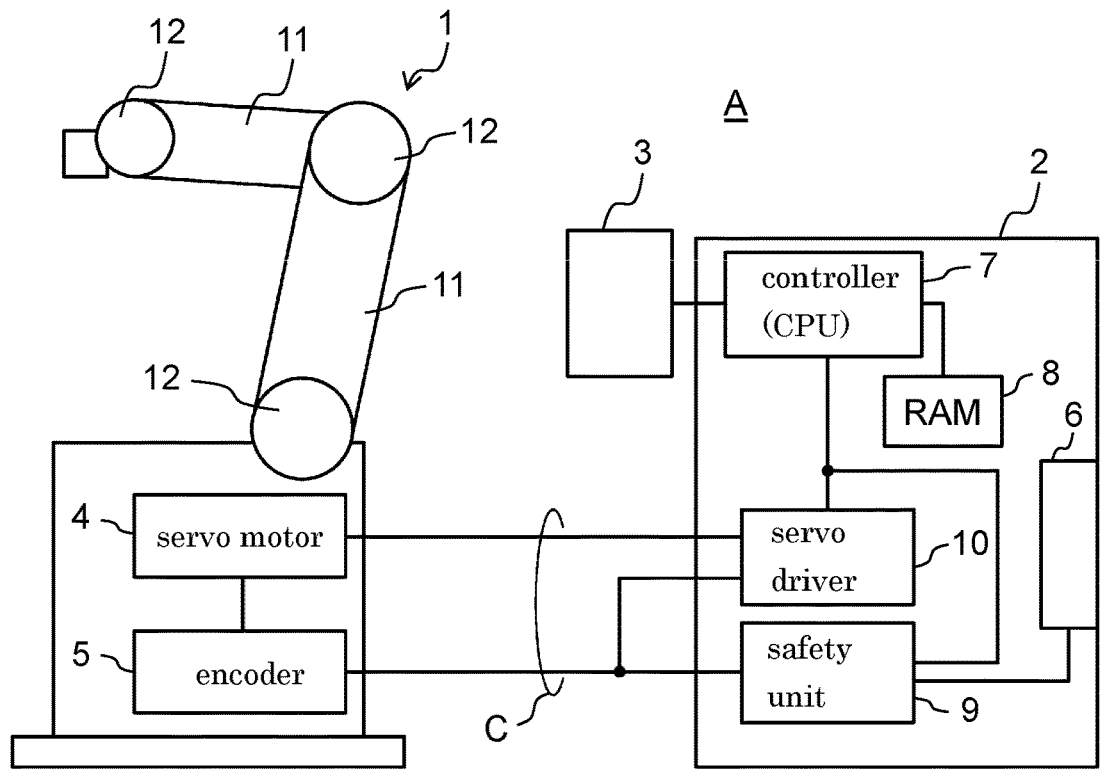
FIG. 6 is a schematic configuration view of the robot control system according to a second exemplary embodiment.
Figure 7:
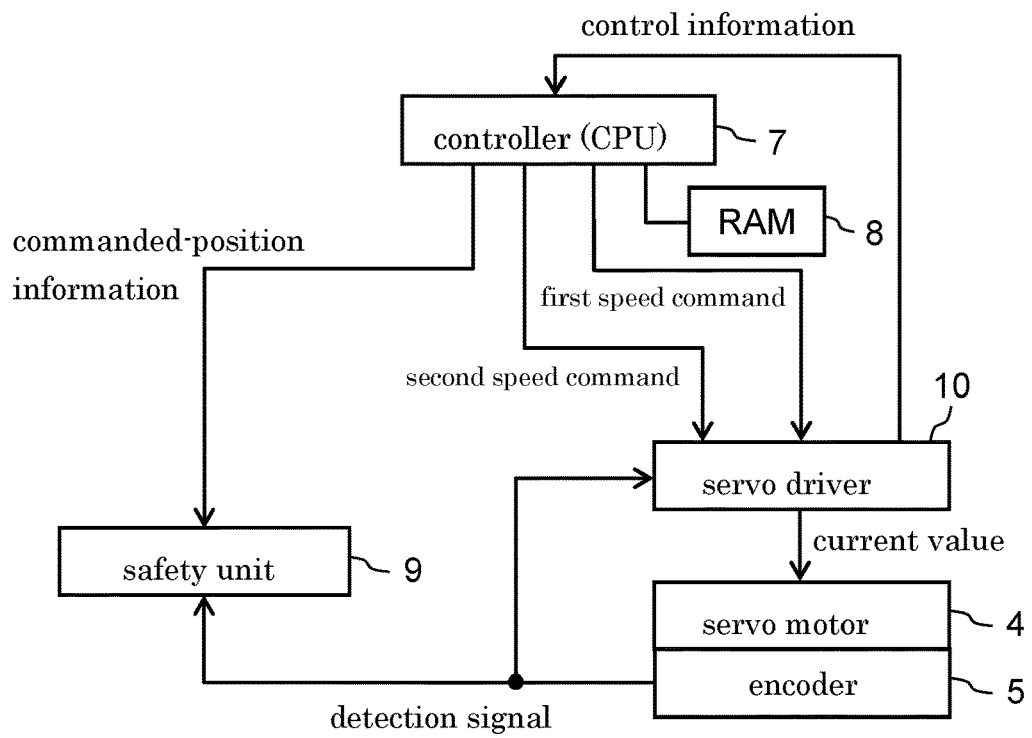
FIG. 7 is a block diagram of a structure of the robot control unit according to the second exemplary embodiment.

FIG. 6 is a schematic configuration view of a robot control system, which is the operating device of the present exemplary embodiment. FIG. 7 is a block diagram of a structure of robot control unit 2 in the robot control system illustrated with arrows indicating the direction of transmission of information and signals.

The robot control system shown in FIG. 6 does not include position sensor 13, but the other components of the system and their functions are the same as those of the robot control system of the first exemplary embodiment. Therefore, their description will be omitted.

FIG. 7 does not include position sensor 13 either. Robot control unit 2 shown in FIG. 7 differs from robot control unit 2 shown in FIG. 2 according to the first exemplary embodiment in that controller 7 sends servo driver 10 first and second speed commands.

The first speed command, which is the same as the speed command of the first exemplary embodiment, is the main speed command. Meanwhile, the second speed command is different from the first speed command generated by controller 7 based on the teaching program information. The second speed command is sent from controller 7 to servo driver 10 when servo driver 10 performs control with faster response (hereinafter, fast response control).

The fast response control will now be described. In some cases, in order to reduce spattering during welding, the robot "A" may suddenly raise one robot arm 11 and pulls it down, for example, at the start of welding. While arm 11 is raised or pulled down, servo driver 10 performs the fast response control in parallel with the normal control. The fast response control also includes the control of rapid acceleration and deceleration of robot arms 11. If controller 7 directly sends servo driver 10 the speed command, which is the operation command of the robot "A" in order to perform such control, servo driver 10 has to process the speed command in a complicated manner. To avoid this happening, controller 7 sends servo driver 10 the second speed command in addition to the first speed command, whereas servo driver 10 determines the target position in consideration of the two speed commands so as to control motors 4.

The Procedure for the Controller to Output the Commanded-Position Information

In the following description, controller 7 sends servo driver 10 the first and second speed commands to perform the fast response control of the robot "A" whereas servo driver 10 controls motors 4 based on these commands and the output signal of encoders 5 as described above in the present exemplary embodiment.

Figure 8A:
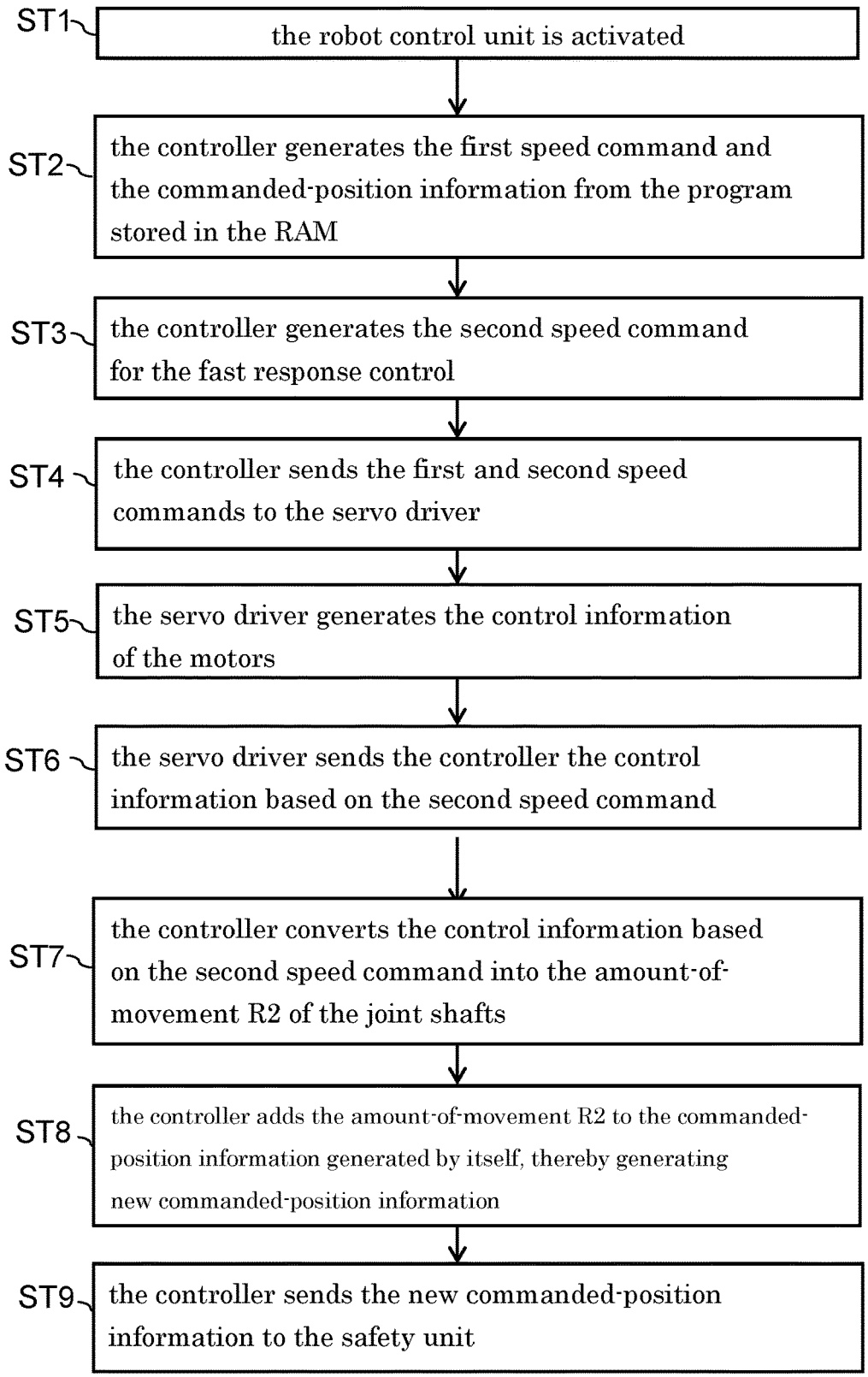
FIG. 8A is a flowchart showing a procedure for the controller to output the commanded-position information.
Figure 8B:
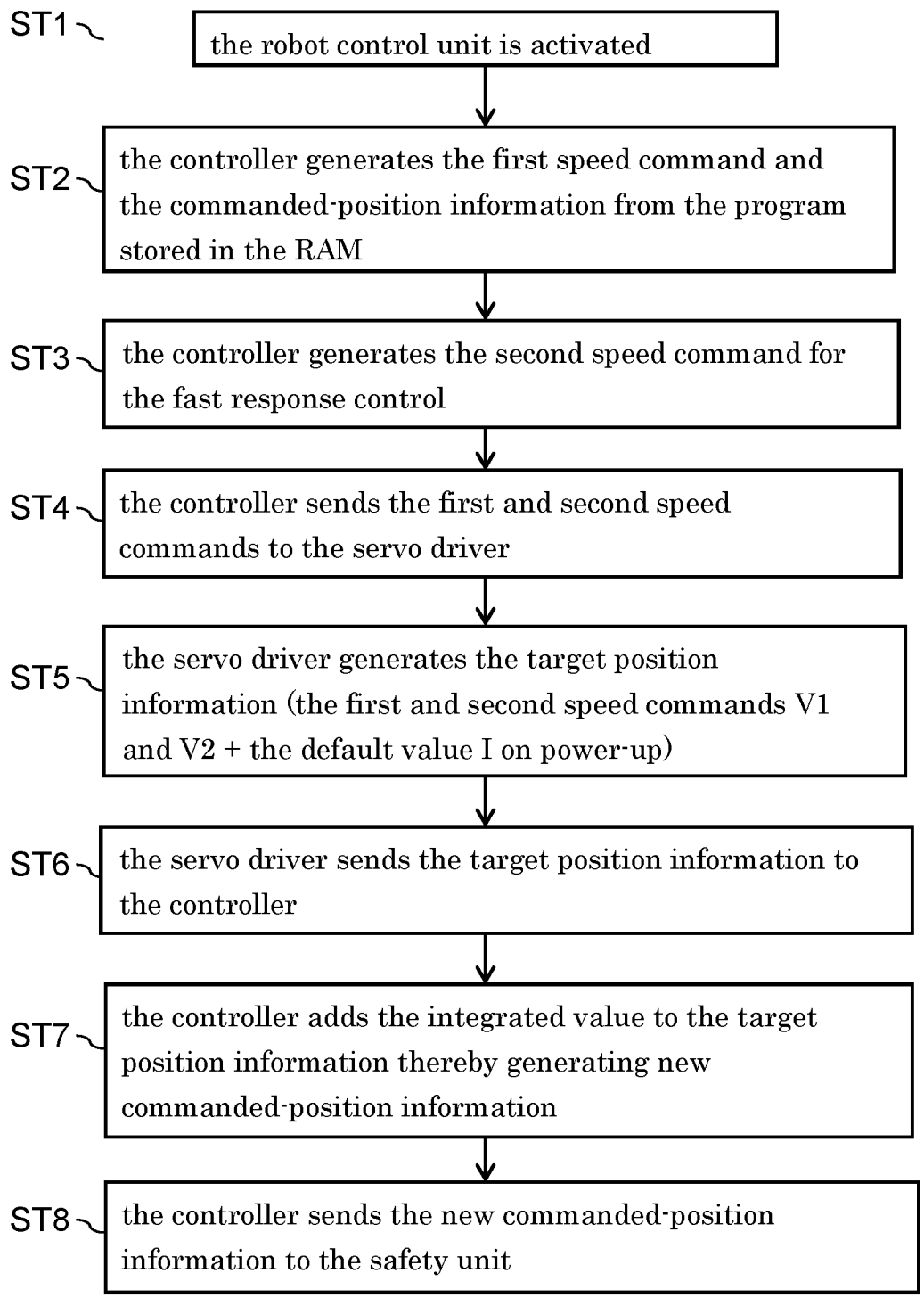
FIG. 8B is a flowchart showing another procedure for the controller to output the commanded-position information.

FIG. 8A is a flowchart showing a procedure for the controller to output the commanded-position information according to the present exemplary embodiment. FIG. 8B is a flowchart showing another procedure for the controller to output the commanded-position information.

Step ST1 and ST2 in FIGS. 8A and 8B are the same as Step ST1 and ST2 in FIGS. 4A and 4B so that their description will be omitted.

In FIG. 8A, controller 7 generates the second speed command for the fast response control (Step ST3), and sends these commands to servo driver 10 (Step ST4). Servo driver 10 generates the control information to control the rotation of motors 4 based on these speed commands and the output signal of encoders 5 (Step ST5). Next, servo driver 10 sends controller 7 the information generated by itself, which is, in this case, the control information based on the second speed command (Step ST6). Controller 7 converts the control information based on the second speed command into the amount-of-movement R2 of the joint shafts (Step ST7). Controller 7 then adds the amount-of-movement R2 as the correction value to the commanded-position information generated by itself, thereby generating new commanded-position information (Step ST8). Controller 7 then sends the new commanded-position information to safety unit 9 (Step ST9).

On the other hand, Steps ST1 to ST4 in FIG. 8B are the same as their equivalents in FIG. 8A. Next, servo driver 10 generates the target position information as the control information to control motors 4 on its own (Step ST5). The "target position information" in this case is the sum of the first and second speed commands V1 and V2 and the default value I on power-up. Servo driver 10 then sends the target position information to controller 7 (Step ST6). The target position information shown in FIG. 8B indicates the relative value held by servo driver 10, or in other words, the amount of travel of the joint shafts from the position at a certain time. Controller 7 adds the integrated value to the received target position information and converts the result into the absolute position or the amount of travel from the point of original (Step ST7). Controller 7 then sends this as the new commanded-position information to safety unit 9 (Step ST8).

In FIGS. 4A and 4B, the step in which servo driver 10 receives the output signal from encoders 5 is not illustrated.

In FIGS. 8A and 8B, the step in which servo driver 10 receives the output signal from encoders 5 is not illustrated.

The steps in the flowcharts of FIGS. 8A and 8B do not necessarily have to be processed in the order shown in the flowcharts; the steps may be processed in different orders or by different methods. For example, Step ST3 may be before Step ST2 or may be parallel-processed with the process of Step ST2.

Method for Detecting a Fault in the Encoders

The method for detecting a fault in the encoders according to the present exemplary embodiment is the same as the method according to the first exemplary embodiment shown in FIG. 5, so that its detailed description will be omitted. It goes without saying that the commanded-position information to be sent from controller 7 to safety unit 9 can be the new commanded-position information shown in FIGS. 8A and 8B.

According to the present exemplary embodiment, too, safety unit 9 determines whether there is a fault in encoders 5 based on the comparison result between the position information directly received from controller 7 and the position information calculated based on the output signal of encoders 5. This enables the determination of the presence or absence of a fault in the encoders by adding safety unit 9 to the operating device such as a general-purpose robot not having a fault detection unit for the encoders. This can further reduce the influence on the existing system because there is no need to redesign the components of the existing general-purpose robot such as servo driver 10. Thus, there is no need to inform the existing system that a process concerning fault determination of the encoders is being performed properly, thereby preventing complications of the processes.

As described above, controller 7 is not informed of the control information generated by servo driver 10 to drive motors 4. This may cause safety unit 9 to fail to properly detect a fault in encoders 5 based on the commanded-position information generated by controller 7.

According to the present exemplary embodiment, servo driver 10 may control the rotation of motors 4 based on the two different speed commands from controller 7 and the output signal of encoders 5. In this case, controller 7 may generate the new commanded-position information from the control information based on the second speed command for fast response. Alternatively, servo driver 10 may generate the target position information based on the two speed commands and converts the result into the absolute position as the new commanded-position information. This enables the control information of motors 4 generated by servo driver 10 on its own to be reflected on the commanded-position information generated by controller 7. In either case, safety unit 9 can be prevented from causing fault misdetection in encoders 5, thereby maintaining high accuracy of fault detection.

When servo driver 10 generates the target position information (see Step ST6 in FIG. 4B), the control response of the robot "A" can be improved because the control cycle of servo driver 10 is shorter than that of controller 7.

In the present exemplary embodiment, when controller 7 does not generate the second speed command, servo driver 10 does not send controller 7 the control information. Instead, controller 7 sends the commanded-position information generated by itself directly to safety unit 9. Thus, fault detection in encoders 5 is performed based on the procedure shown in FIG. 5.

As described above, the first exemplary embodiment has been described as one example of the technique disclosed in the present application; however, the technique of the present disclosure is not limited to this and is subject to modification, replacement, addition, or elimination.

The first and second exemplary embodiments may alternatively have the following structures.

Modified Example (1)

Figure 9:
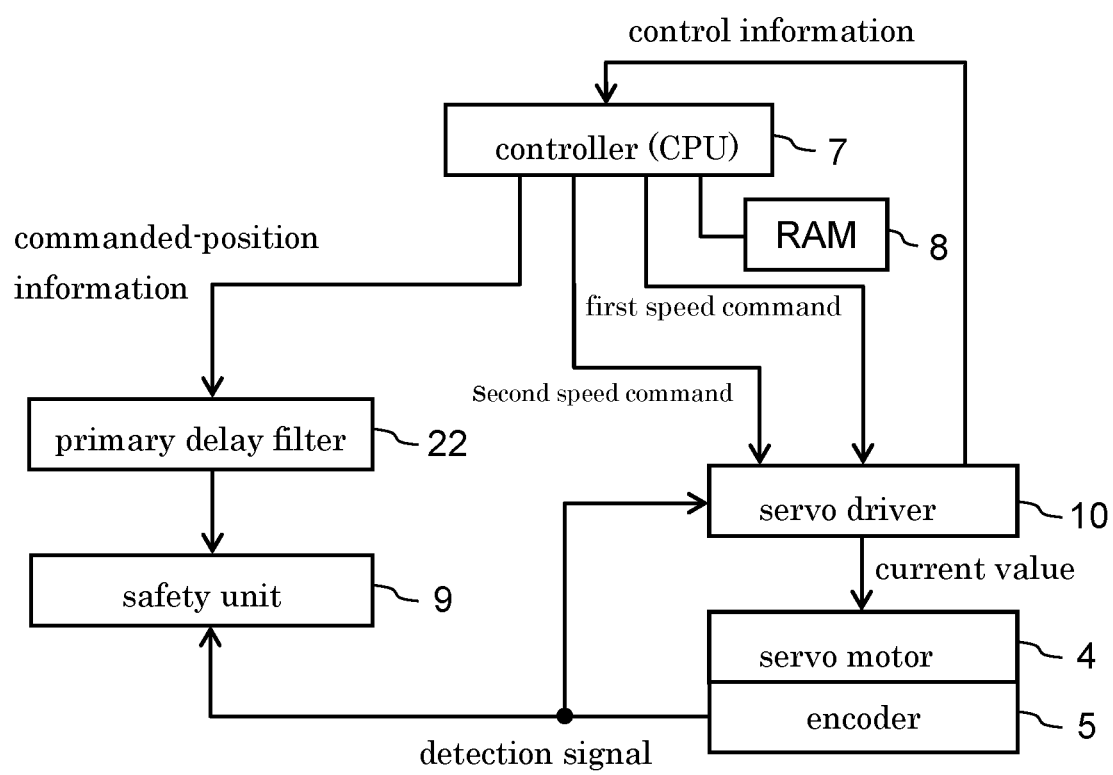
FIG. 9 is a block diagram of another structure of the robot control unit.

FIG. 9 is a block diagram of the structure of the robot control unit according to Modified Example (1).

The structure shown in FIG. 9 is a combination of the structure of FIG. 6 and primary delay filter 22 disposed between controller 7 and safety unit 9. Primary delay filter 22 is a delay control filter for controlling a general control delay. It goes without saying that primary delay filter 22 shown in FIG. 9 is applicable to the structure shown in FIG. 2.

In the actual control of the robot "A", a comparison of the same time period may indicate that there may be a displacement between the rotational position of any of motors 4 (motor command position) based on the commanded-position information that safety unit 9 received from controller 7, and the rotational position of motors 4 (motor detection position) based on the output signal that safety unit 9 received from encoders 5. This displacement is due, for example, to the properties of motor control. More specifically, the displacement is due to a fixed delay caused as follows. Controller 7 of robot control unit 2 outputs the speed command and the commanded-position information first. After that, servo driver 10 actually control motors 4, which operate based on the control.

Figure 10:
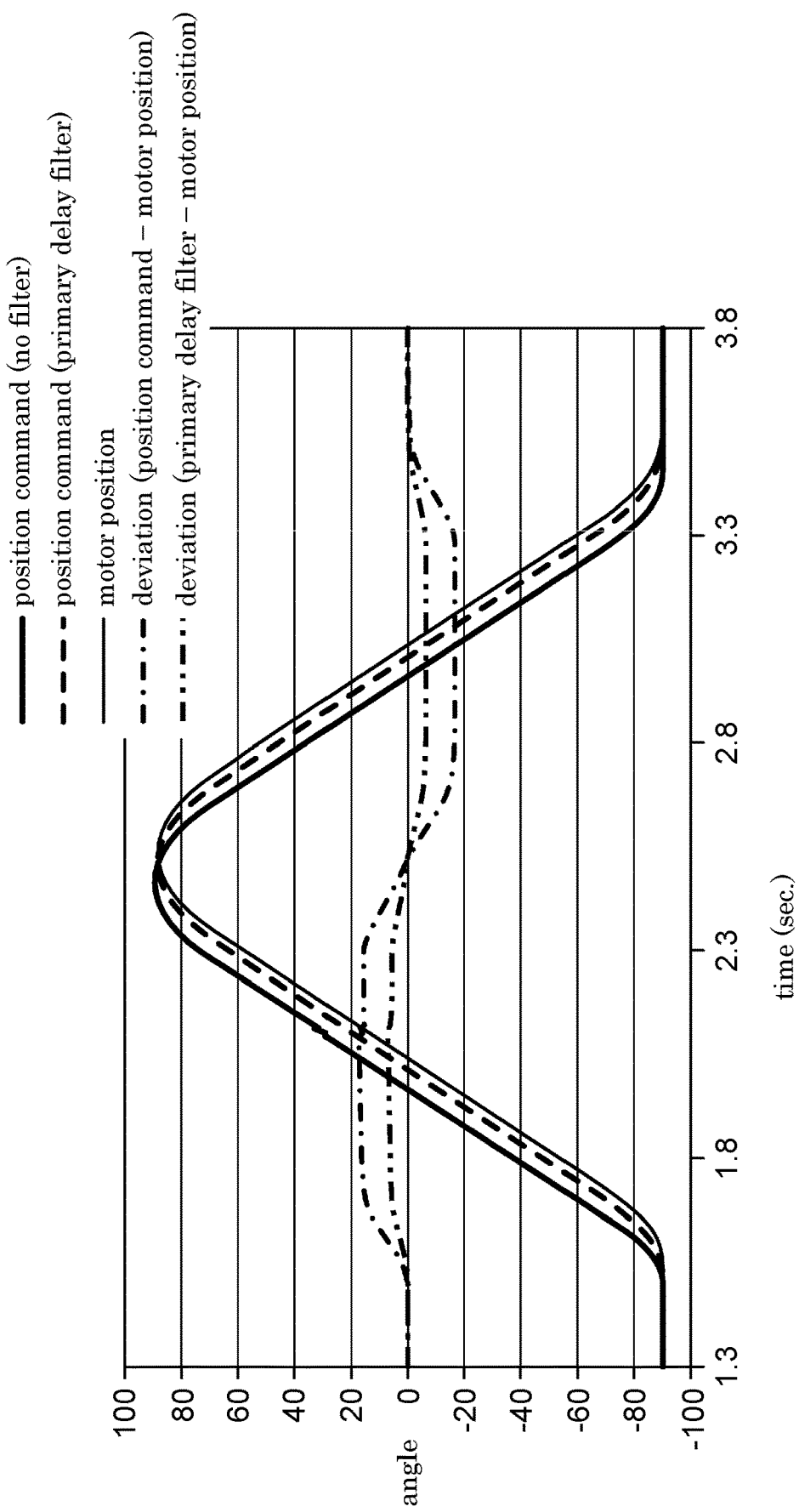
FIG. 10 is a graph showing the relationship between the motor command position and the motor detection position.

FIG. 10 is a graph showing the relationship between the motor command position (the thick solid line in FIG. 10), and the motor detection position (the thin solid line in FIG. 10) when joint shafts 12 of robot arms 11 are reciprocated at maximum speed. A comparison between these thick and thin solid lines in FIG. 10 shows that there is a maximum delay of about 0.1 seconds, which corresponds to a delay of about 18 degrees in terms of angle (see the one-dot chain line in FIG. 10).

Meanwhile, as shown by the broken line and the two-dot chain line shown in FIG. 10, the provision of primary delay filter 22 has greatly reduced the difference between the motor command position and the motor detection position. In FIG. 10, the broken line represents the motor command position in the structure shown in FIG. 9 whereas the two-dot chain line represents the deviation between the motor command position and the motor detection position in the structure shown in FIG. 9.

The structure shown in FIG. 9 achieves the fault determination of the encoders with higher accuracy than the structure shown in FIG. 2 or 6. More specifically, for example, the threshold Pth used for the comparison between the detected-position information and the commanded-position information may be determined based on the difference between the motor command position and the motor detection position. In this case, a decrease in the difference between these positions can reduce the threshold Pth, thereby improving the accuracy of the fault determination of the encoders.

Note that the method for detecting a fault in encoders 5 according to Modified Example (1) is not described in detail because it is the same as the procedure shown in FIG. 5.

Modified Example (2)

Figure 11:
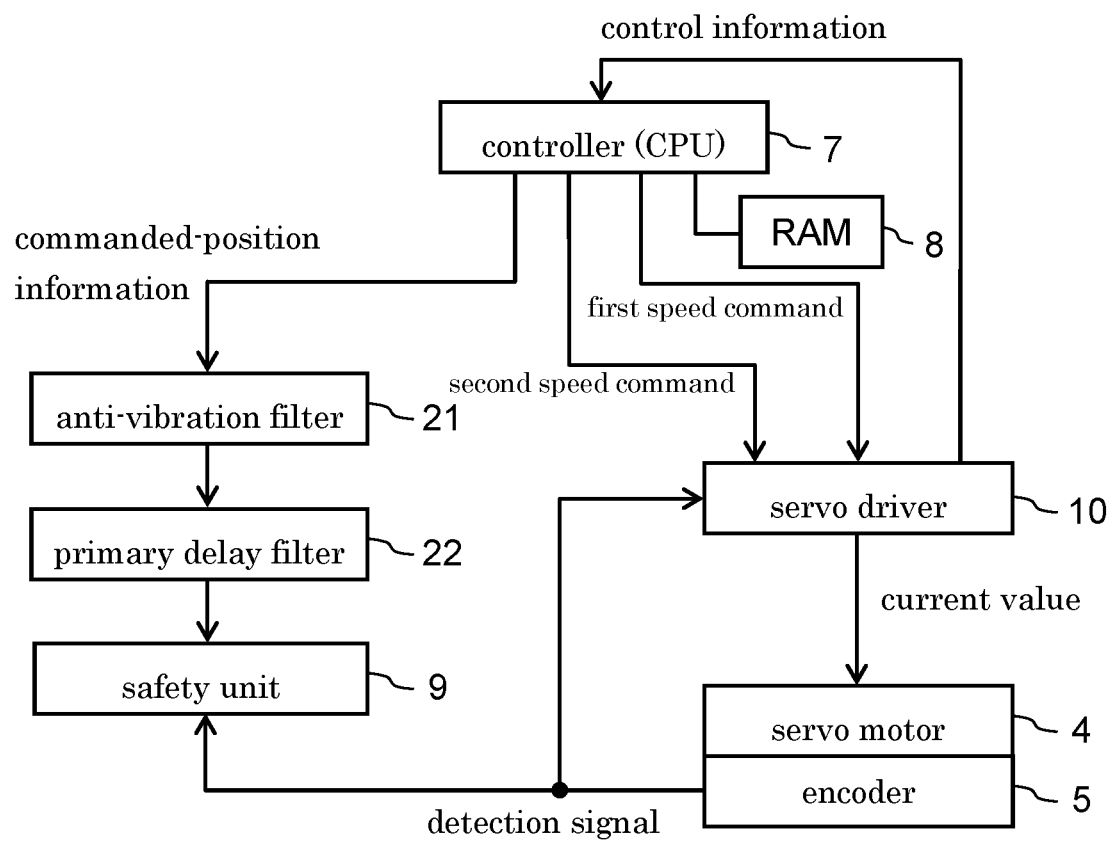
FIG. 11 is a block diagram of another structure of the robot control unit.

FIG. 11 is a block diagram of the structure of the robot control unit of Modified Example (2).

The structure of FIG. 11 is a combination of the structure of FIG. 9 and anti-vibration filter 21, which is disposed between controller 7 and safety unit 9 and is connected in series with primary delay filter 22.

As mentioned above, in the actual control of the robot "A", servo driver 10 may perform high response control for some types of operation control. One such case is where control at high speed and high trackability is performed with a welding robot using a laser. In such a high response control, motors 4 may be vibrated by excitation components contained in the commanded-position information. The vibration of motors 4 is usually reduced by providing an anti-vibration filter (not shown) between servo driver 10 and motors 4. Hence, performing the high response control with the structure shown in FIG. 11 enables the generation of a command similar to the control exerted by servo driver 10.

Figure 12:
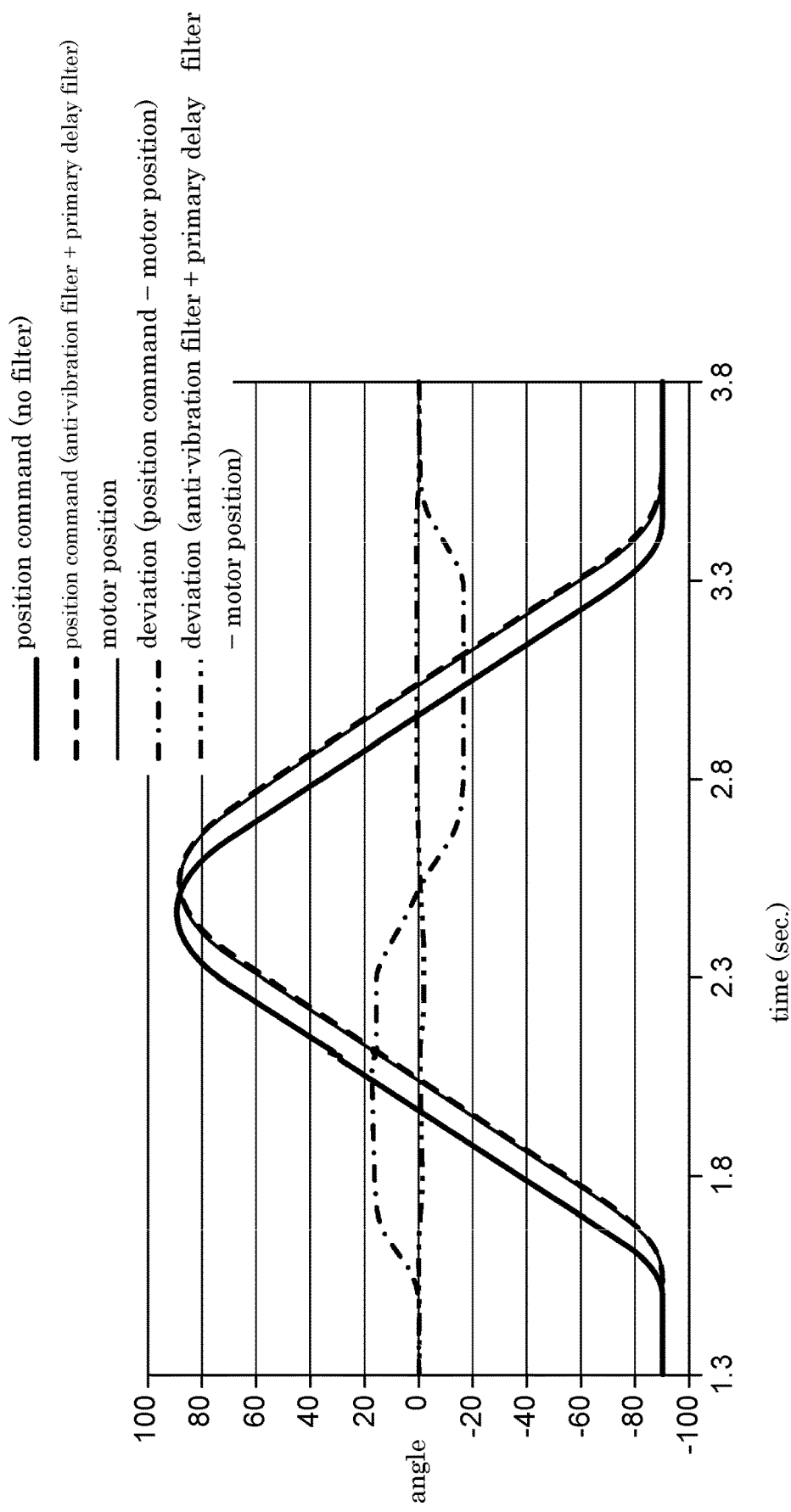
FIG. 12 is a graph showing the relationship between the motor command position and the motor detection position.

FIG. 12 is a graph showing the relationship between the motor command position and the motor detection position when joint shafts 12 of robot arms 11 are reciprocated at maximum speed. The thick and thin solid lines are the same as their equivalents in FIG. 10 and indicate the operation performed in the structure (see FIG. 2) not using primary delay filter 22 or anti-vibration filter 21. In FIG. 12, the broken line represents changes in the motor command position in the structure shown in FIG. 11, and the two-dot chain line represents the deviation between the motor command position and the motor detection position in the structure shown in FIG. 11. The graph in FIG. 12 indicates that providing anti-vibration filter 21 in addition to primary delay filter 22 further reduces the difference between the motor command position and the motor detection position.

Thus, the structure shown in FIG. 11 can perform fault determination of the encoders more accurately than the structures shown in FIGS. 2 and 9. More specifically, similar to Modified Example (1), the structure shown in FIG. 11 can reduce the threshold Pth, thereby increasing the accuracy of the fault determination of the encoders. Anti-vibration filter 21 is used to remove resonant components from the received commanded-position information. Anti-vibration filter 21 and primary delay filter 22 may be provided directly in any order, or only one of them may be provided.

In FIG. 11, filters 21 and 22 may be replaced by each other without a decrease in the effects.

Modified Example (3)

Figure 13:
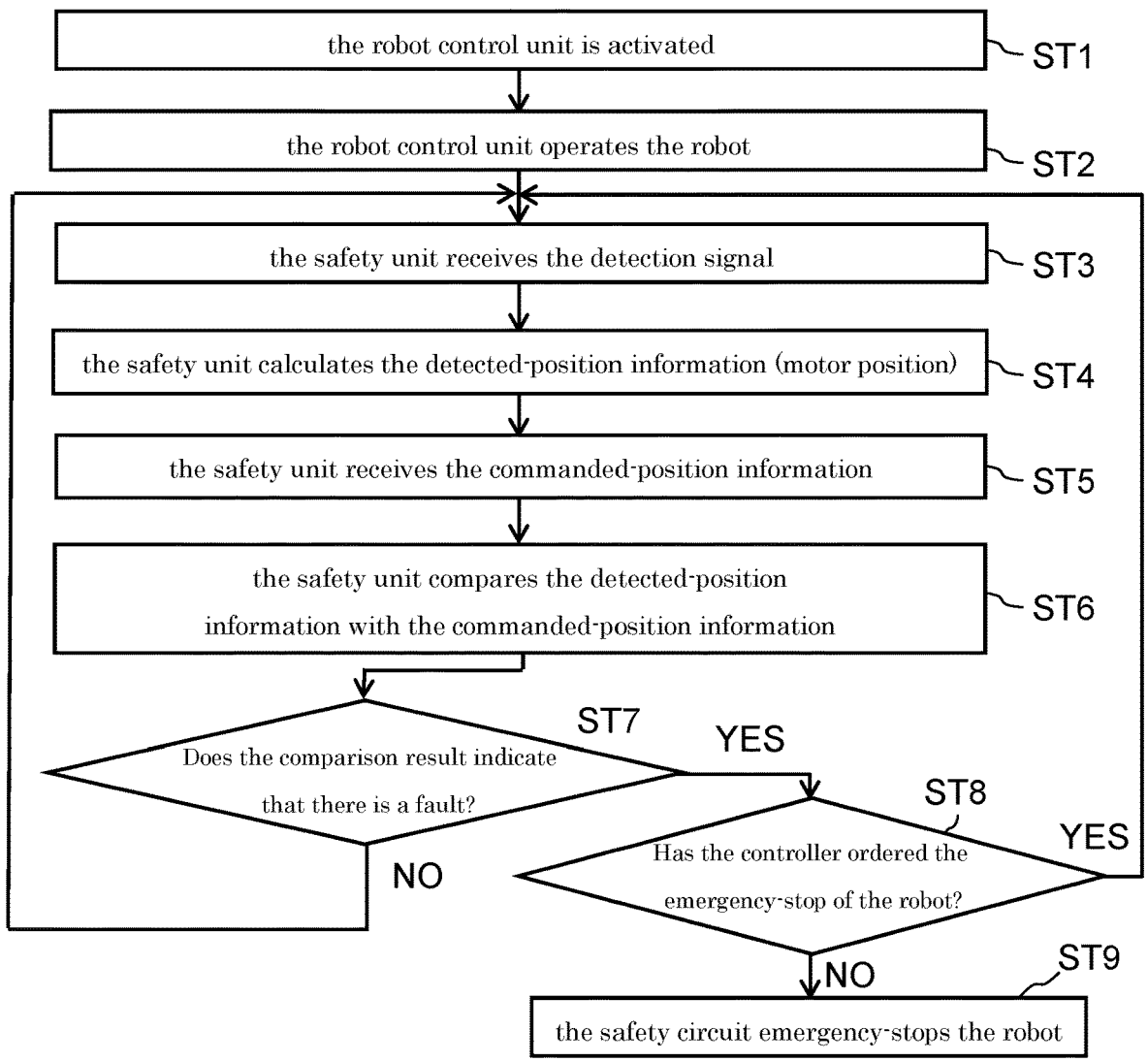
FIG. 13 is a flowchart showing another example of the method for determining the presence or absence of a fault in an encoder.

The method for determining the presence or absence of a fault shown in FIG. 5 may alternatively be performed according to the procedure shown in FIG. 13. In FIG. 13, Steps ST1 to ST6 are the same as their equivalents in FIG. 5 so that their detailed description will not be repeated here.

In FIG. 13, when the difference between the motor command value and the motor detection value is not less than the predetermined value (YES in Step ST7), the process proceeds to Step ST8. In Step ST8, CPUs 92 of safety unit 9 determine whether controller 7 has ordered the emergency-stop of the robot "A".

More specifically, when emergency-stopping the robot "A", controller 7 sends safety circuit 6 an emergency stop signal (not shown). Upon receiving this signal, safety circuit 6 stops the driving power supply of the robot "A" so as to stop the robot "A". In Modified Example (3), safety unit 9 receives the emergency stop signal from controller 7, and determines in Step ST8 whether controller 7 has outputted the emergency stop signal. When controller 7 has outputted the signal (YES in Step ST8), the process returns to Step ST3. Thus, even when the difference between the motor command value and the motor detection value is not less than the predetermined value, safety unit 9 does not determine that there is a fault in encoders 5.

Meanwhile, when controller 7 has not outputted the emergency stop signal (NO in Step ST8), the process proceeds to Step ST9. In Step ST9, CPUs 92 of safety unit 9 send safety circuit 6 the emergency stop signal. Upon receiving the signal, safety circuit 6 emergency-stops the robot "A".

Performing Step ST8 after Step ST7 eliminates the possibility of safety unit 9 erroneously determining that there is a fault in encoders 5 when the robot "A" is emergency-stopped by the command of controller 7. More specifically, when controller 7 stops the robot "A" by outputting the emergency stop signal, controller 7 is prevented from outputting the commanded-position information. Therefore, if safety unit 9 continued to compare the motor command value with the motor detection value, encoders 5 might be determined to be faulty although they are operating properly. However, performing the process according to the Modified Example (3) can prevent the occurrence of such problems.

The steps in the flowcharts of FIGS. 5 and 13 do not necessarily have to be processed in the order shown in the flowcharts; the steps may be processed in different orders or by different methods. For example, Steps ST3 and ST4 may be parallel-processed with the process of Step ST5.

Third Exemplary Embodiment

The present exemplary embodiment will describe a method for detecting a fault in the encoders when the robot "A" operates in succession.

The basic structure and operation when the robot "A" operates in succession are identical to their equivalents in the first exemplary embodiment. Therefore, the description of the present exemplary embodiment will be focused on the successive operation of the robot "A".

Figure 14:
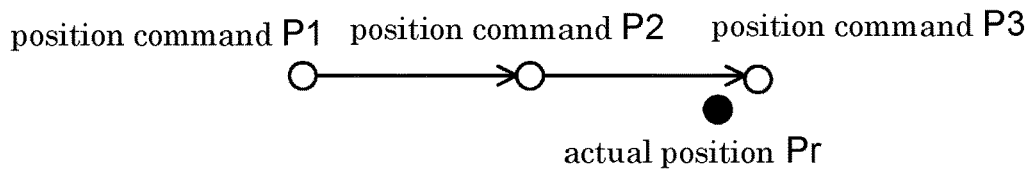
FIG. 14 shows the relationship between the motor command position and the actual position when the joint shaft proceeds as described in the third exemplary embodiment.

FIG. 14 shows the relationship between the motor command positions P1 to P3 and the actual motor position Pr (hereinafter, also referred to as "present position Pr") in the case that joint shafts 12 make a progressive movement in such a manner that the motor command position is moved from P1 to P2, and then from P2 to P3 based on the speed command from controller 7. In the progressive movement shown in FIG. 14, when the motor command position is moved to the position P3, the present position Pr is near P3. Therefore, fault detection in encoders 5 can be performed according to the procedure shown in FIG. 5 or 13.

Figure 15:
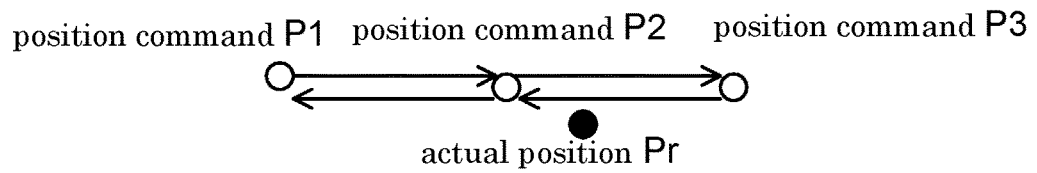
FIG. 15 shows the relationship between the motor command position and the actual position when the joint shaft reciprocates as described in the third exemplary embodiment.

Meanwhile, as shown in FIG. 15, when joint shafts 12 reciprocate in such a manner that the motor command position based on the speed command from controller 7 moves from P1 to P3 via P2 and returns from P3 to P1 via P2, safety unit 9 may erroneously determine that there is a fault in encoders 5. For example, when the reciprocation shown in FIG. 15 is performed at high speed, servo driver 10 may allow motors 4 to make a return, making the present position Pr return from P2 to P1 before the position Pr reaches or closely approaches P3. Assume, in such a case, that safety unit 9 compares the motor command position based on the commanded-position information P3 with the motor detection position based on the present position Pr of motor 4. In this case, safety unit 9 may erroneously determine that there is a fault in encoders 5 due to the large difference between the positions P3 and Pr although encoders 5 are properly operating.

Figure 16:
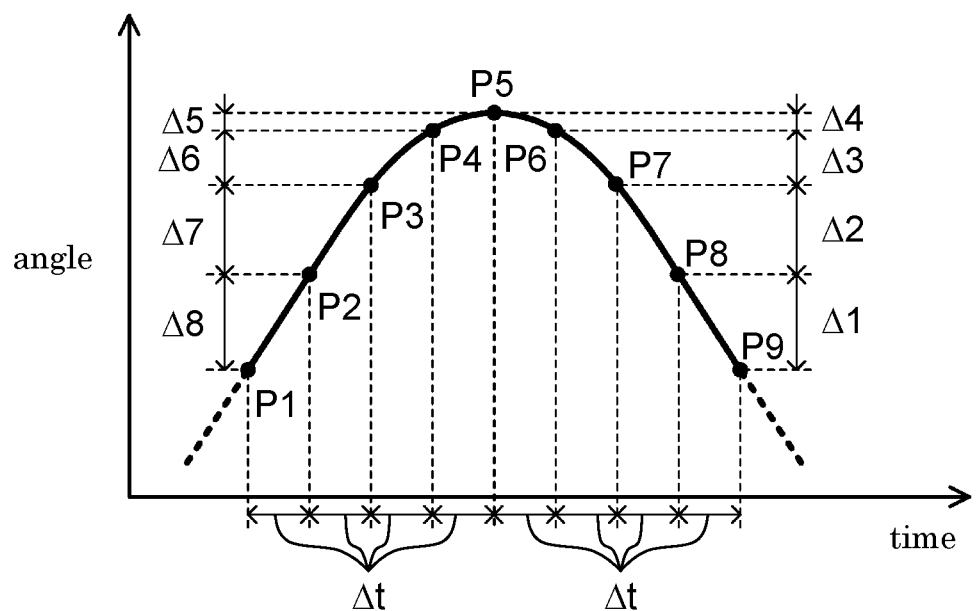
FIG. 16 is a graph showing the relationship between the motor command position and the motor detection position.

To prevent this happening, in Step ST5 of FIGS. 5 and 13, CPUs 92 integrate the amount of change Δn of the motor command value based on the commanded-position information (the amount of difference Δn between the commanded position and the immediately preceding commanded position) n times (e.g., five times). More specifically, for example, when joint shafts 12 are reciprocated from point P1 to point P9 as shown in the solid line in FIG. 16, the amount of change Δn is integrated five times of Δ1 to Δ5. In other words, the integrated value Δ is equal to the total of Δ1+Δ2+Δ3+Δ4+Δ5. FIG. 16 is a graph showing the motor command position when joint shafts 12 of robot arms 11 are reciprocated.

In Step ST6, CPUs 92 compare the value obtained by adding or subtracting the integrated value Δ to or from the motor command value with the motor detection value calculated based on the detected-position information. In Step ST7, the presence or absence of a fault in the encoders is determined based on the comparison result. More specifically, when the motor detection value P(fs) satisfies Mathematical Formula 1 shown below, encoders 5 are not determined to be faulty. In this case, the amount of change Δn is integrated in absolute value regardless of the direction of change. The amount of change Δn varies in proportion to the speed of the motors. In short, when the motors are driven at high speed, the amount of change Δn has a large value whereas when the motors are driven at low speed, the amount of change Δn has a small value.

$$Pn-\Delta \leq P(fs) \leq Pn+\Delta$$

$$(\Delta = \Delta 1+\Delta 2+\Delta 3+\Delta 4+\Delta 5+ \ldots \Delta n) \quad \text{Mathematical Formula 1}$$

Thus, when the robot performs a specific operation such as reciprocation, CPUs 92 can be prevented from determining that there is a fault in encoders 5 in spite that encoders 5 are operating properly.

According to the above-described method for detecting a fault in encoders 5, the integrated value Δ may be zero while the robot "A" is not working for a certain period due, for example, to an emergency-stop. To avoid this happening, in Step ST5, Mathematical Formula 1 may be replaced by Mathematical Formula 2 shown below, where a predetermined threshold Th is added to the integrated value Δ.

$$Pn-\Delta \leq P(fs) \leq Pn+\Delta$$

$$(\Delta = \Delta 1+\Delta 2+\Delta 3+\Delta 4+\Delta 5+ \ldots \Delta n+Th) \quad \text{Mathematical Formula 2}$$

There are cases where the commanded-position information from controller 7 is not modified for a predetermined period of time, or in other words, controller 7 orders the robot "A" not to move for a predetermined period of time. In such a case, the provision of the threshold Th enables safety unit 9 to detect a fault even while the robot is performing an operation not intended by the control device. As a result, the robot "A" can be emergency-stopped.

It goes without saying that the commanded-position information in the Modified Examples (1) to (3) and the third exemplary embodiment can be new commanded-position information shown in FIGS. 4A, 4B, 8A, and 8B.

The first exemplary embodiment has described the case where the differential signal from position sensor 13 enters servo driver 10, but may alternatively enter controller 7. For example, in the flowchart of FIG. 4A, Step ST1 may be followed by a step in which controller 7 receives the differential signal from position sensor 13. This step may be followed by Step ST2 in which the commanded-position information is generated and corrected based on the differential signal. To be more specific, when servo driver 10 controls motor 4 based on the speed command, the output signal, and the differential signal from position sensor 13, controller 7 operates as follows. Controller 7 receives the differential signal from position sensor 13, and then adds a correction value converted from the differential signal to the commanded-position information so as to generate new commanded-position information. Controller 7 sends the new commanded-position information to safety unit 9. In this example, Steps ST4 to ST8 in FIG. 4A are omitted, thereby simplifying the procedure of sending the commanded-position information to safety unit 9, thereby reducing the time for transmission.

INDUSTRIAL APPLICABILITY

According to the method for transmitting information from the controller in the present disclosure, when the servo driver controls the motors based on other information than the main speed command from the controller and the output signal of the encoders, the safety unit can be prevented from causing fault misdetection in the encoders. According to the method for detecting a fault in the encoders in the present disclosure, even in the case of using a general-purpose encoder, the presence or absence of a fault in the encoders can be detected with minimum influence on the existing functions and existing devices. Therefore, these methods are useful for industrial robots such as general-purpose welding robots and other operating devices.

REFERENCE MARKS IN THE DRAWINGS

A robot (operating device)
W workpiece
4 motor
5 encoder
7 controller
8, 93 RAM (storage)
9 safety unit (fault detection unit)
10 servo driver
12 joint shaft (output shaft)
13 position sensor
21 anti-vibration filter
22 primary delay filter (delay control filter)
92 CPU (determination unit)
94 encoder receiver (first receiver)
95 DPRAM (second receiver)

The invention claimed is:

1. A method for transmitting information from a controller included in an operating device, the operating device being configured to machine a workpiece and further including:
   a robot arm having an output shaft;
   a motor connected to the output shaft;
   an encoder configured to detect a rotational position of the motor;

a position sensor configured to output, as a differential signal, an amount of displacement of a position of the workpiece from a predetermined position;
a driver configured to receive
a speed command from the controller,
an output signal from the encoder, and
the differential signal from the position sensor,
the driver being further configured to control driving of the motor at least based on the speed command and the output signal; and
a fault detection unit configured to detect a fault in the encoder,
the controller being configured to output
the speed command indicating the rotational position of the motor, and
commanded-position information showing the rotational position indicated by the speed command,
the method comprising:
generating, by the driver, control information for controlling a rotation of the motor based on the differential signal, the speed command, and the output signal;
transmitting the differential signal from the driver to the controller;
converting, by the controller, the received differential signal into an amount-of-movement of the output shaft, the amount-of-movement being a rotation angle of the motor in a clockwise or a counterclockwise direction;
generating, by the controller, new commanded-position information by adding the amount-of-movement to the commanded-position information; and
transmitting the new commanded-position information to the fault detection unit.

2. The method according to claim 1, further comprising:
generating, by the driver, target position information based on the differential signal and the speed command so as to transmit the target position information from the driver to the controller; and
transmitting the target position information as the new commanded-position information from the controller to the fault detection unit.

3. A method for detecting a fault in an encoder, the encoder being configured to detect a rotational position of a motor, the motor being configured to drive an output shaft of an operating device including the encoder and the motor, the operating device further including:
a fault detection unit configured to detect the fault in the encoder;
a controller configured
to output a speed command indicating the rotational position of the motor, and
to transmit commanded-position information to the fault detection unit by using the method for transmitting the information according to claim 1, the commanded-position information showing the rotational position indicated by the speed command; and
a driver configured
to receive the speed command from the controller and an output signal from the encoder and
to control driving of the motor based on the speed command and the output signal,
the method for detecting the fault in the encoder, comprising:
receiving, by the fault detection unit, the commanded-position information from the controller and the output signal from the encoder, respectively;
calculating, by the fault detection unit, detected-position information of the motor based on the output signal;
comparing, by the fault detection unit, the commanded-position information with the detected-position information; and
determining, by the fault detection unit, that the encoder is faulty when a difference between the commanded-position information and the detected-position information is not less than a predetermined value.

4. The method for detecting the fault in the encoder according to claim 3, wherein
in the receiving step, the fault detection unit receives from the controller the commanded-position information compensated for a time delay caused by a delay in drive control of the motor, and
in the determining step, the fault detection unit determines a presence or absence of the fault in the encoder based on a comparison result between the detected-position information and the commanded-position information compensated for the time delay.

5. The method for detecting the fault in the encoder according to claim 3, wherein
in the receiving step, the fault detection unit receives from the controller the commanded-position information from which a resonant component has been removed, and
in the determining step, the fault detection unit determines a presence or absence of the fault in the encoder based on a comparison result between the detected-position information and the commanded-position information from which the resonant component has been removed.

6. The method for detecting the fault in the encoder according to claim 3, wherein in the determining step, the fault detection unit determines a presence or absence of the fault in the encoder based on a comparison result between the detected-position information and a sum of the commanded-position information and an integrated value of an amount of change of the commanded-position information.

7. The method for detecting the fault in the encoder according to claim 6, wherein in the determining step, the fault detection unit determines the presence or absence of the fault in the encoder based on a comparison result between the detected-position information and a value obtained by adding a predetermined threshold to the sum of the integrated value and the commanded-position information.

8. The method for detecting the fault in the encoder according to claim 3, wherein
the operating device further includes a safety circuit configured to emergency-stop the operating device,
the controller is configured to send the safety circuit an emergency stop signal in case of an emergency, and
in the determining step, when detecting the emergency stop signal sent from the controller, the fault detection unit does not determine that the encoder is faulty even if the difference between the commanded-position information and the detected-position information is not less than the predetermined value.

9. A method for transmitting information from a controller included in an operating device, the operating device further including:
a robot arm having an output shaft;
a motor connected to the output shaft;
an encoder configured to detect a rotational position of the motor;

a driver configured to receive
- first and second speed commands from the controller, and
- an output signal from the encoder, the driver being configured to control driving of the motor based on the output signal and at least one of the first and second speed commands; and a fault detection unit configured to detect a fault in the encoder, the controller being configured to output
- the first speed command indicating the rotational position of the motor, the first speed command being generated based on teaching program information,
- the second speed command when the driver performs fast response control, the fast response control being control performed by the driver in parallel with a normal control when the robot arm is suddenly raised or pulled down, and
- commanded-position information showing the rotational position indicated by the first speed command, the method comprising:

generating, by the controller, the second speed command for the fast response control;

transmitting the first speed command and the second speed command from the controller to the driver;

generating, by the driver, control information to control the rotation of the motor based on the first speed command, the second speed command, and the output signal of encoder;

transmitting the control information generated by the driver to the controller;

converting, by the controller, the control information into an amount-of-movement of the output shaft, the amount-of-movement being a rotation angle of the motor in a clockwise or a counterclockwise direction;

generating, by the controller, new commanded-position information by adding the amount-of-movement to the commanded-position information; and transmitting the new commanded-position information to the fault detection unit.

10. The method according to claim 9, further comprising:

generating, by the driver, target position information based on the first and second speed commands so as to transmit the target position information from the driver to the controller; and generating, by the controller, the new commanded-position information based on the target position information so as to transmit the new commanded-position information from the controller to the fault detection unit.

\* \* \* \* \*